United States Patent [19]

Lee

[11] Patent Number: 5,023,847

[45] Date of Patent: Jun. 11, 1991

[54] BOOM EVENT ANALYZER RECORDER

[75] Inventor: Robert A. Lee, Fairborn, Ohio

[73] Assignee: The United States of America as represented by the Secretary of the Air Force, Washington, D.C.

[21] Appl. No.: 374,385

[22] Filed: Jun. 30, 1989

[51] Int. Cl.$^5$ ............................................. G01S 3/00
[52] U.S. Cl. ................................... 367/136; 367/906; 235/400
[58] Field of Search ..................... 367/127, 136, 906; 235/400; 273/372

[56] References Cited

U.S. PATENT DOCUMENTS 3,484,741 12/1969 Hyman ................................ 367/906
3,868,856  3/1975 Fletcher et al. ...................... 73/647
4,308,602 12/1981 Knight et al. ........................ 367/906
4,357,531 11/1982 Knight ................................. 367/906

Primary Examiner—Ian J. Lobo
Attorney, Agent, or Firm—Bernard E. Franz; Donald J. Singer

[57] ABSTRACT

An analyzer recorder collects sonic boom information of supersonic aircraft and launch vehicles, for use to validate Environmental Impact Statements that contain supersonic aircraft activity. The device comprises a 16-bit microprocessor, a random access memory (RAM) storage, a data retrieval unit (DRU), and a microcomputer. It samples and captures in digital form any loud impulse noise from background noise. The unattended device can discern a sonic boom from the normal background noise and capture it in permanent solid RAM storage for later analysis. The RAM modules can then be transferred with the DRU and the information on the DRU transferred to the microcomputer. The microprocessor displays each recorded event, time of occurrence and summary information for all the stored data.

4 Claims, 26 Drawing Sheets

BOOM EVENT ANALYZER RECORDER (BEAR)

BOOM EVENT ANALYZER RECORDER (BEAR)

BEAR ADDRESS MAP
X = DO NOT CARES    - = AS DECODED BY TARGET DEVICE

| A23 | A22 | A21 | A20 | A19 | A18 | A17 | A16 | A15 | A14 | A13 | A12 | A11 | A10 | A9 | A8 | A7 | A6 | A5 | A4 | A3 | A2 | A1 | Addresses | Comments |
|---|---|---|---|---|---|---|---|---|---|---|---|---|---|---|---|---|---|---|---|---|---|---|---|---|
| 0 | 0 | 0 | 0 | 0 | 0 | 0 | 0 | 0 | 0 | x | x | x | x | x | x | x | x | x | x | x | x | x | 000000>003FFF | EPROMS |
| 0 | 0 | 0 | 0 | 0 | 0 | 0 | 0 | 1 | 0 | - | x | x | x | x | x | x | x | x | x | x | x | x | 0080000>008FFF | SRAM |
| 0 | 0 | 0 | 0 | 0 | 0 | 0 | 1 | 0 | - | - | - | - | - | - | - | - | - | - | - | - | - | - | 010000 | ADC |
| 0 | 0 | 0 | 0 | 0 | 0 | 0 | 1 | 1 | - | - | - | - | - | - | - | - | - | - | - | - | - | - | 018000 | BAT RAM ON/OFF |
| 0 | 0 | 0 | 0 | 0 | 0 | 1 | 0 | 0 | - | - | - | - | - | - | - | - | - | - | - | x | x | x | 020001>020003 | DISP |
| 0 | 0 | 0 | 0 | 0 | 0 | 1 | 0 | 1 | - | - | - | - | - | - | - | - | - | - | - | x | x | x | 028001>028007 | PIA |
| 0 | 0 | 0 | 0 | 0 | 0 | 1 | 1 | 0 | - | - | - | - | - | - | - | - | - | - | x | x | x | x | 03001>03000F | PTM |
| 0 | 0 | 0 | 0 | 0 | 0 | 1 | 1 | 1 | x | - | - | - | - | - | - | - | - | - | - | - | - | x | 03800 | SPARE2 |
| 1 | 0 | 0 | 0 | 0 | 0 | 0 | - | - | - | - | - | - | - | - | - | - | - | - | - | - | - | - | 800000>81FFFF | BRAM P#1 |
| 1 | 0 | 0 | 0 | 0 | 0 | 1 | - | - | - | - | - | - | - | - | - | - | - | - | - | - | - | - | 820000>83FFFF | BRAM P#2 |
| 1 | 0 | 0 | 0 | 0 | 1 | 0 | - | - | - | - | - | - | - | - | - | - | - | - | - | - | - | - | 840000>85FFFF | BRAM P#3 |
| 1 | 0 | 0 | 0 | 0 | 1 | 1 | - | - | - | - | - | - | - | - | - | - | - | - | - | - | - | - | 860000>87FFFF | BRAM P#4 |
| 1 | 0 | 0 | 0 | 1 | 1 | 0 | 0 | - | - | - | - | - | - | - | - | - | - | - | - | - | x | x | 8C0000 | Running Avg RAM |
| 1 | 0 | 0 | 0 | 1 | 1 | 1 | 0 | - | - | - | - | - | - | - | - | - | - | - | - | - | x | x | 8E0000 | Running Avg RAM |

NOTES:
Only the lowest possible addresses are shown for devices accessed with partial address decoding (those that contain "do not cares").
Spare #2 is a synchronous address block.

Fig. 28

BOOM EVENT ANALYZER RECORDER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to a boom event analyzer recorder (BEAR), and more particularly to an analyzer recorder to collect sonic booms of supersonic aircraft and launch vehicles.

Sonic boom information is required to validate Environmental Impact Statements that contain supersonic aircraft activity.

In the prior practice, all sonic boom data was collected using analog FM recorders. These had to be manned and turned on prior to the boom event allowing only capture of scheduled events. They also required AC power so a van or truck was needed to field all the equipment needed to collect booms.

U.S. patents of interest include U.S. Pat. No. 3,484,741 to Hyman, which teaches a shock wave sensor having directional capability. U.S. Pat. No. 4,308,602 to Knight teaches a target device which detects the pressure wave generated by a projectile. A computer is used to indicate location and shape of the target. U.S. Pat. No. 4,357,531 to Knight teaches a target device similar to that in the Knight U.S. Pat. No. 4,308,602 but provides in addition a microprocessor and display to detect the shape and location of the target.

SUMMARY OF THE INVENTION

An objective of the invention is to provide for the capture of an entire boom waveform discriminating it from all other non-boom events.

The invention relates to a boom event analyzer recorder (BEAR) device for sampling and capturing in digital form any loud impulse noise from background noise. The device comprises a 16-bit microprocessor, a random access memory (RAM) storage, a data retrieval unit (DRU), and a microcomputer. The device can discern a sonic boom from the normal background noise and capture it in permanent solid RAM storage for later analysis. The RAM modules can then be transferred with the DRU and the information on the DRU transferred to the microcomputer. The microprocessor displays each recorded event, time of occurrence and summary information for all the stored data.

The BEAR's evaluation criteria eliminates the need for a manned system by evaluating the noise environment in real time and capturing only the boom. This allows for capture of scheduled and non-scheduled events. The unit is also portable, weighing less than 50 lbs., allowing it to be set quickly and in remote sites instead of requiring motor vehicle access to collect boom data.

BRIEF DESCRIPTION OF THE DRAWING

FIG. 28 is a BEAR address map.

DETAILED DESCRIPTION

Figure 1:
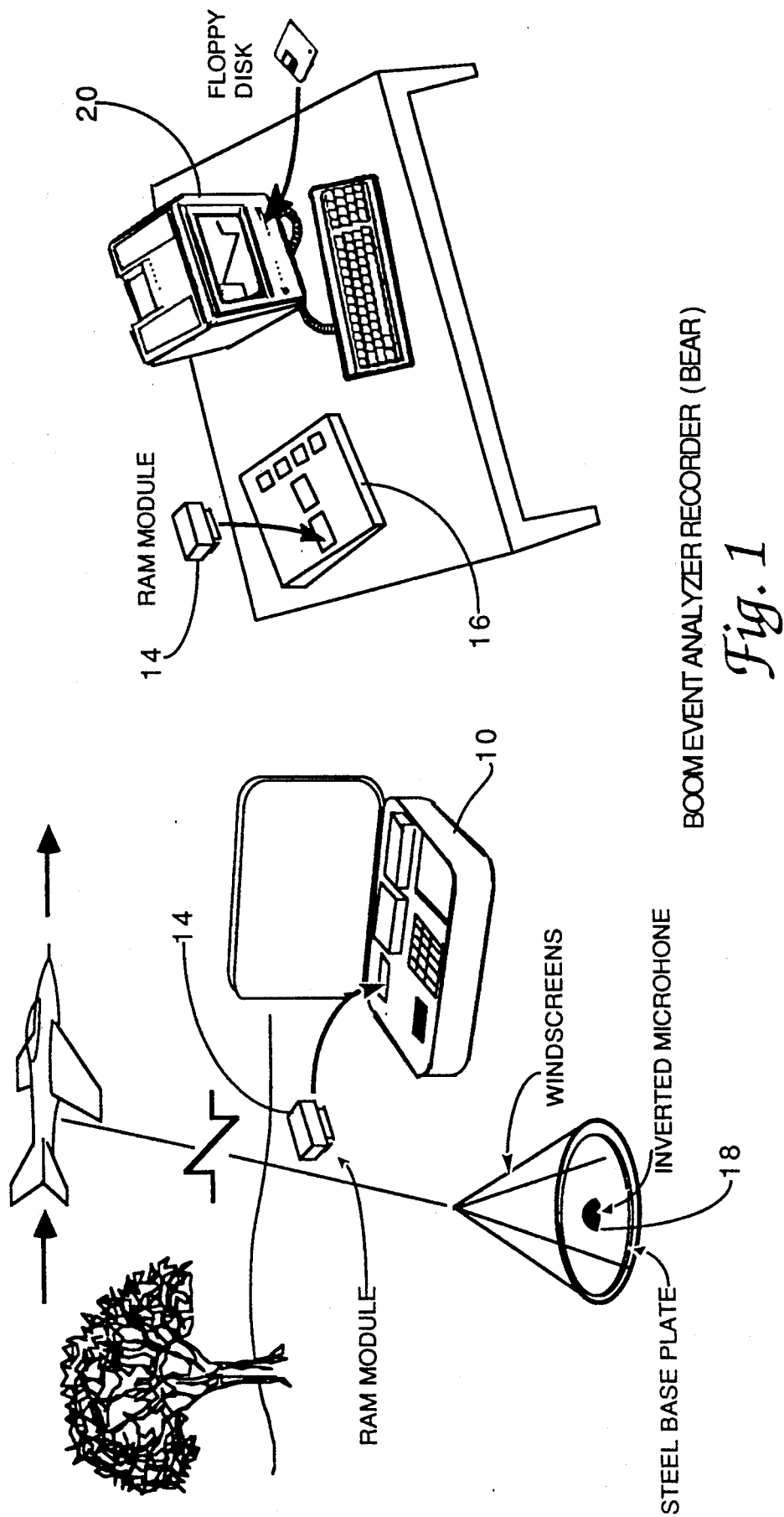
FIG. 1 is a pictorial block diagram of a Boom Event Analyzer Recorder (BEAR)

As shown in FIG. 1, the Boom Event Analyzer Recorder comprises a recorder unit 10, and a data recovery unit 16 which operates with a microcomputer 20. These units are described in a document titled "Boom Event Analyzer Recorder (BEAR) Software Description" and a document titled "Data Recovery Unit". The first document includes a 68-page program listing having the heading "FILE: BEAR$_{13}$ 8: BEAR" Copies of these documents, as well as a revised set of drawings for the first document, are included with this application as filed as an integral part of the application as though fully set forth in this specification.

FIG. 1 shows a boom event analyzer recorder (BEAR) device for sampling and capturing in digital form any loud impulse noise from background noise. The device comprises a 16-bit microprocessor, a random access memory (RAM) storage 14, a data retrieval unit (DRU) 16, and a microcomputer 20. The device can discern a sonic boom from the normal background noise and capture it in permanent solid RAM storage for later analysis. The RAM modules can then be transferred with the DRU and the information on the DRU transferred to the microcomputer. The microprocessor displays each recorded event, time of occurrence and summary information for all the data stored.

The BEAR uses a unique evaluation of level, duration, pulse time and risetime to screen out all non-boom or non-impulsive events. This boom event evaluation is described in FIG. 2. These parameters are selectable via the input keypad to make the BEAR a very flexible instrument with which to capture a wide variety of impulsive events. The BEAR used a PCB piezo resistive microphone 18 model number 107BWH to acquire the low frequency response needed to accurately capture the sonic boom waveform. With other transducers the BEAR could effectively be used to capture any transient, sporadic signal.

The Boom Event Analyzer Recorder (BEAR), is a 16 bit microprocessor based instrument that continuously samples the noise then captures and stores the digital waveform of any loud impulse noise. The recorder can discern a sonic boom from the normal background noise and capture it in permanent solid state random access memory (RAM) storage for later analysis. The RAM modules can then be interfaced with a Data Retrieval Unit (DRU) 16 and the information on the DRU transferred to a Zenith Z-100 microcomputer 20. The microcomputer displays each recorded event, time of occurrence and summary information for all the data stored.

The BEAR digitizes the noise environment at 8 kHz and analyses it during the downtime between the sampling intervals giving it real time screening for sonic boom events. The BEAR examines the event level, duration, pulse time and rise time to determine if it should be stored as a boom event. These parameters are selectable via the input keypad to make the BEAR a very flexible instrument with which to capture a wide variety of impulsive events. Along with setting the boom evaluation criteria, the keypad allows input of date, time, test number, location and serial number of the unit. This information is stored in the same RAM modules as data every time any parameter is changed. The operator can also select three other modes from this keypad: calibration, clear memory or data save. In the calibration mode the BEAR simply displays the root-mean-square level of two seconds of the input signal to the microphone for checking against a standard 124 dB sound pressure level piston phone calibrator. No data is saved to the RAM modules in this mode. The clear memory mode asks the operator to input a special code and, when entered, simply erases the RAM modules and runs the BEAR unit through the internal self test routines that verify all the hardware components are working properly. The third mode allows the operator to collect one second of data with no screening. This allows the operator to collect and store background noise or calibrator signal or anything that is desired. The BEAR has a frequency response of 0.5 Hz to 2,500 Hz for reproducing a sonic boom time history adequate for environmental impact analysis. The maximum overpressure the BEAR is designed for is 165.2 dB (76 pounds per square foot or 3639 pascal) with an 80 dB usable dynamic range. The RAM modules on a single unit have 512K of memory allowing the BEAR to store over 100 "normal" sonic booms. The BEAR is designed to operate with a PCB Piezo resistive microphone that is totally sealed and extremely rugged making the BEAR able to operate in the environmental extremes of temperature present in the Southwest U.S. (0-65 degrees C.).

Once the sonic boom data is collected the RAM modules are transferred to the DRU for downloading the data. The microcomputer 20 initiates its communications program (COMM) to accept this data from the DRU. This data is stored as two large raw data files (ABEARDAT.-B- & BBEARDAT.-B-) inside the microcomputer 20. This file contains the BEAR setup parameters, boom data, captured data and parameter changes all separated by a series of three "barker codes" (hexidecimal values of 90 EB). The microcomputer's process program then reads this file and breaks it up into individual files on each event that contain the data, plus all the BEAR parameter sets at the time that the data was taken. Each file is given a specific file name corresponding to the date, time, location of its occurrence according to the following scheme. (i.e. PSSHHmmI.MDD, where P indicates a processed event, SS=site number, HHmm=local time in hours and minutes, I=incrementer (A.Z) to differentiate between events that occurred in the same minute at the same location, MDD=month and day). These files are store on a floppy disk in a binary format and can be graphically displayed on the microcomputer 20 by invoking the VIEW command.

BOOM CAPTURE OPERATION

The BEAR is designed such that after turning the unit on it will do an internal self analysis and come up ready to capture sonic boom data. The BEAR default parameters are set for normal unattended use for the majority of USAF supersonic operations. For this use the operator need only set the "A" parameters for specific test numbers and site number for later identification. This default mode will capture any sonic boom greater than 0.1 PSF (107 dB). If the boom is larger than 76.4 PSF, the BEAR will capture the event but the top of the N wave will be clipped. The BEAR will operate unattended for 1 day on the internal rechargeable small batteries and for 8 days on the 3 external rechargeable batteries. The batteries operating the removable RAM modules 14 are good for approximately 7 years.

Figure 3:
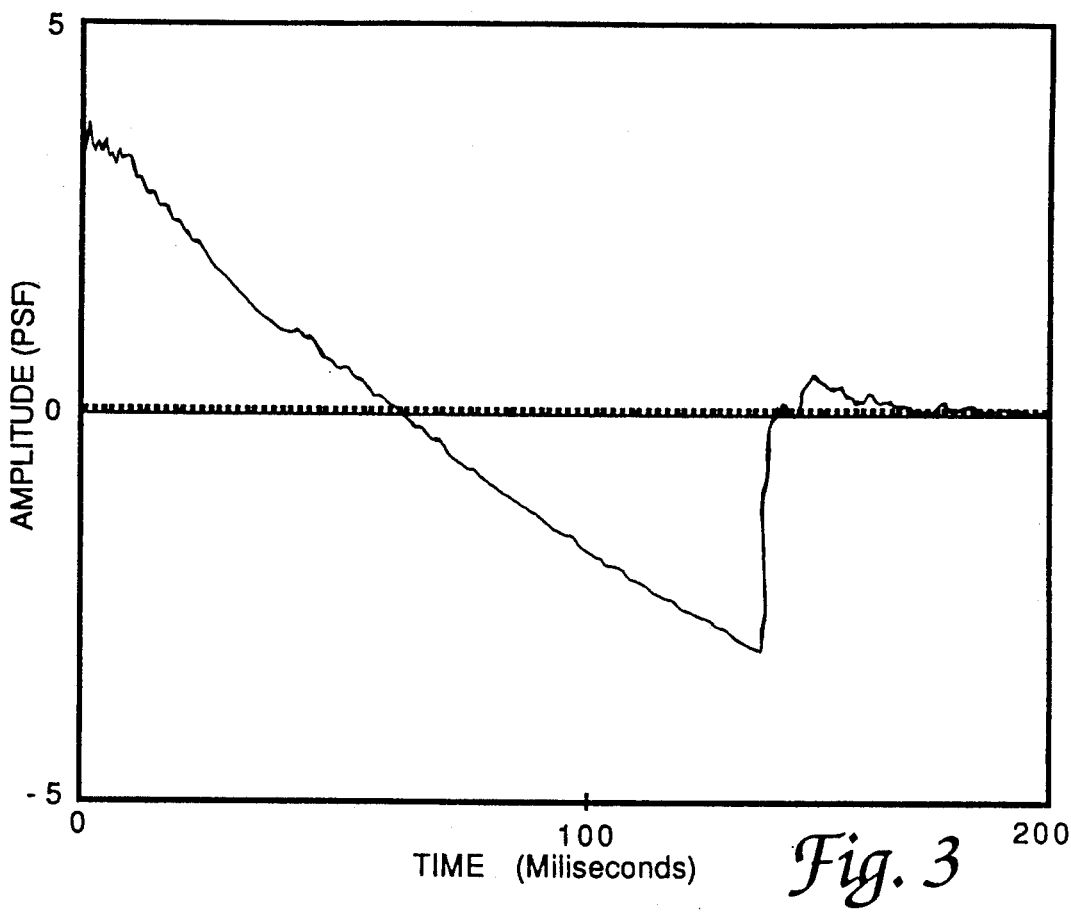
FIGS. 3-6 are graphs of sonic booms, with FIG. 3 showing a clean N-wave, FIG. 4 showing a ragged N-wave, FIG. 5 showing a focussed N-wave, and FIG. 5 showing a boom near lateral cutoff.
Figure 4:
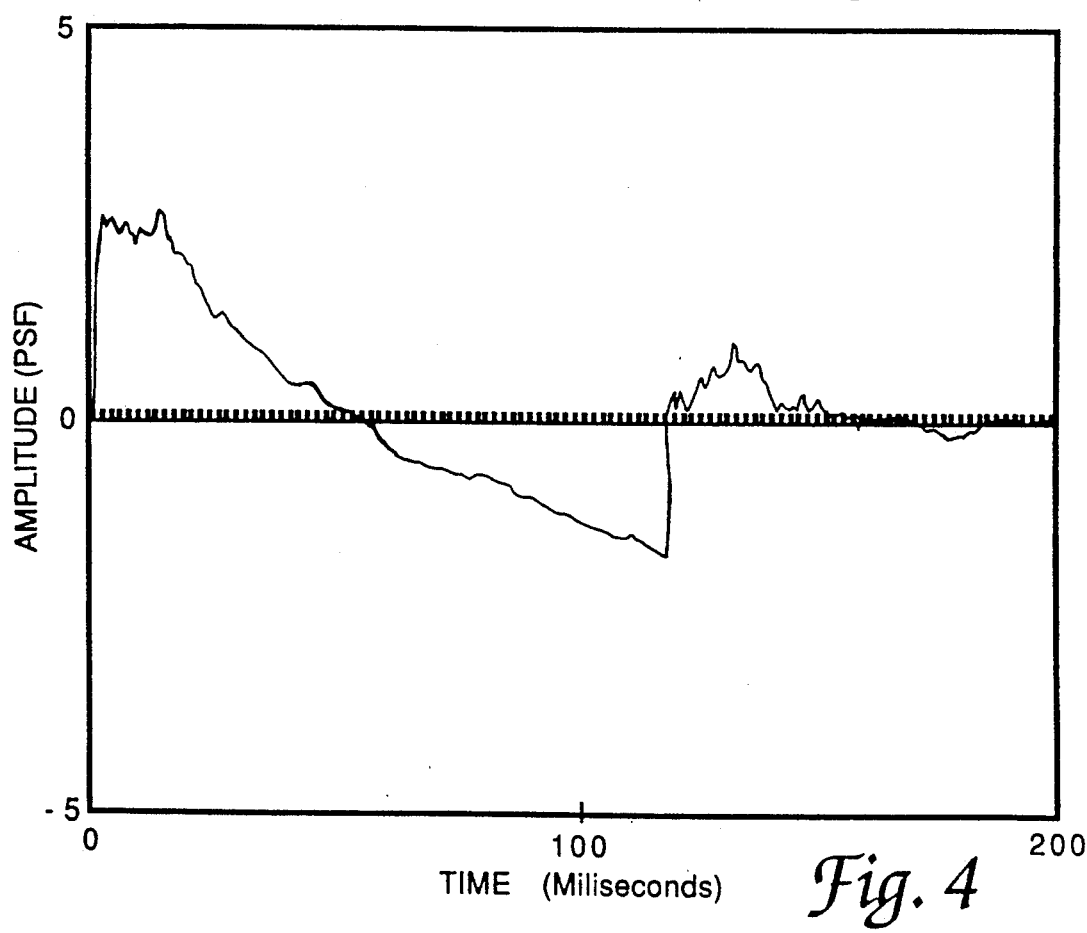
Figure 5:
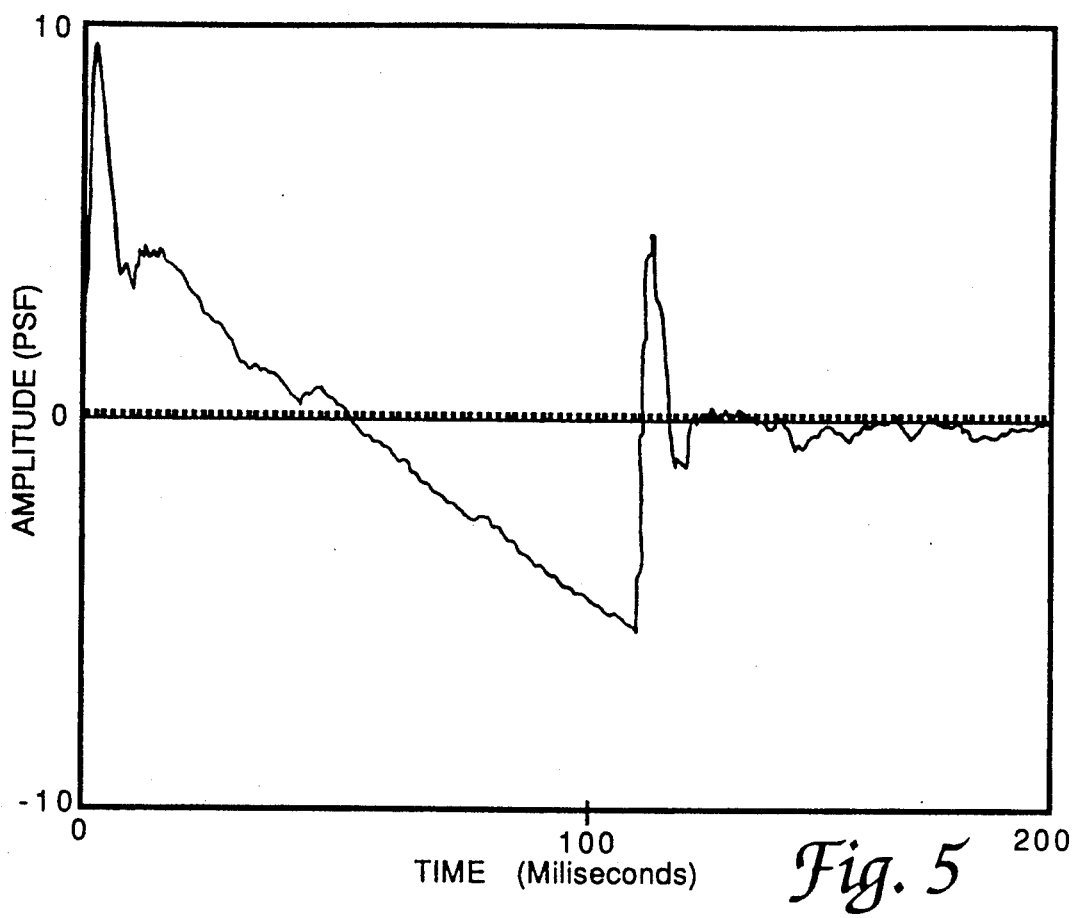
Figure 6:
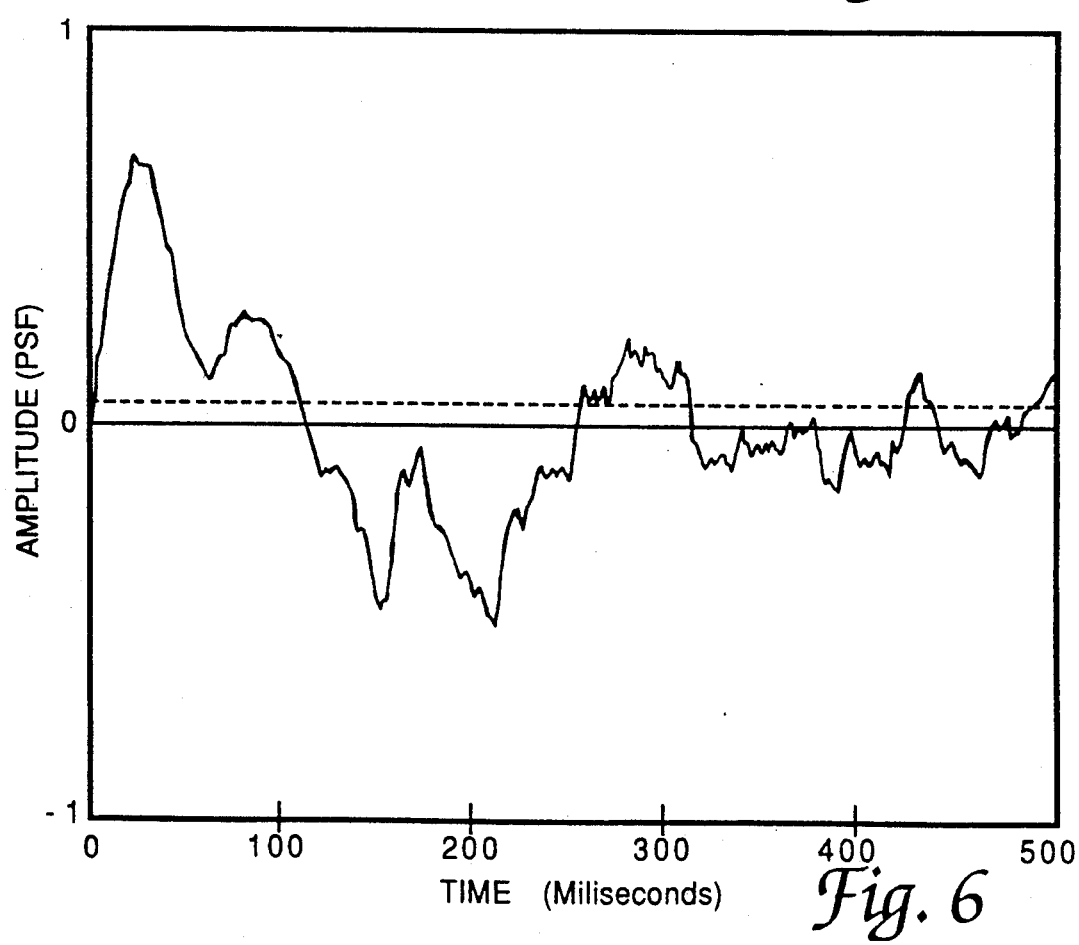

A normal sonic boom propagating under quiescent atmospheric conditions will produce a typical N-shaped pressure signature as in FIG. 3. A clean N-wave like this will have typical rise time of 0.5 to 5 milliseconds to reach the peak overpressure. Its positive pulse time will be about ⅓ of the total boom duration (typically longer than 50 milliseconds). As a clean boom propagates under adverse weather conditions the peak of the N-wave will become ragged as in FIG. 4. This can effectively cause the risetime (i.e. time to rise to the signatures peak) to be dramatically increased to the range of 5 to 30 milliseconds and cause a slight shortening of the positive pulse time. If the aircraft is accelerating, decelerating or turning, the boom signature can become focussed causing an increase in the peaks to be superimposed on the N-wave as per FIG. 5. In extreme cases this focusing effect can cause the N-wave to be distorted to a typical U-wave. This will cause a dramatic shortening of the positive pulse time. As the boom is approaching the lateral cutoff point, it is being refracted up and away from the ground causing the boom to degenerate into typical subsonic noise. FIG. 6 is the boom signature very close to the lateral cutoff point.

Figure 2:
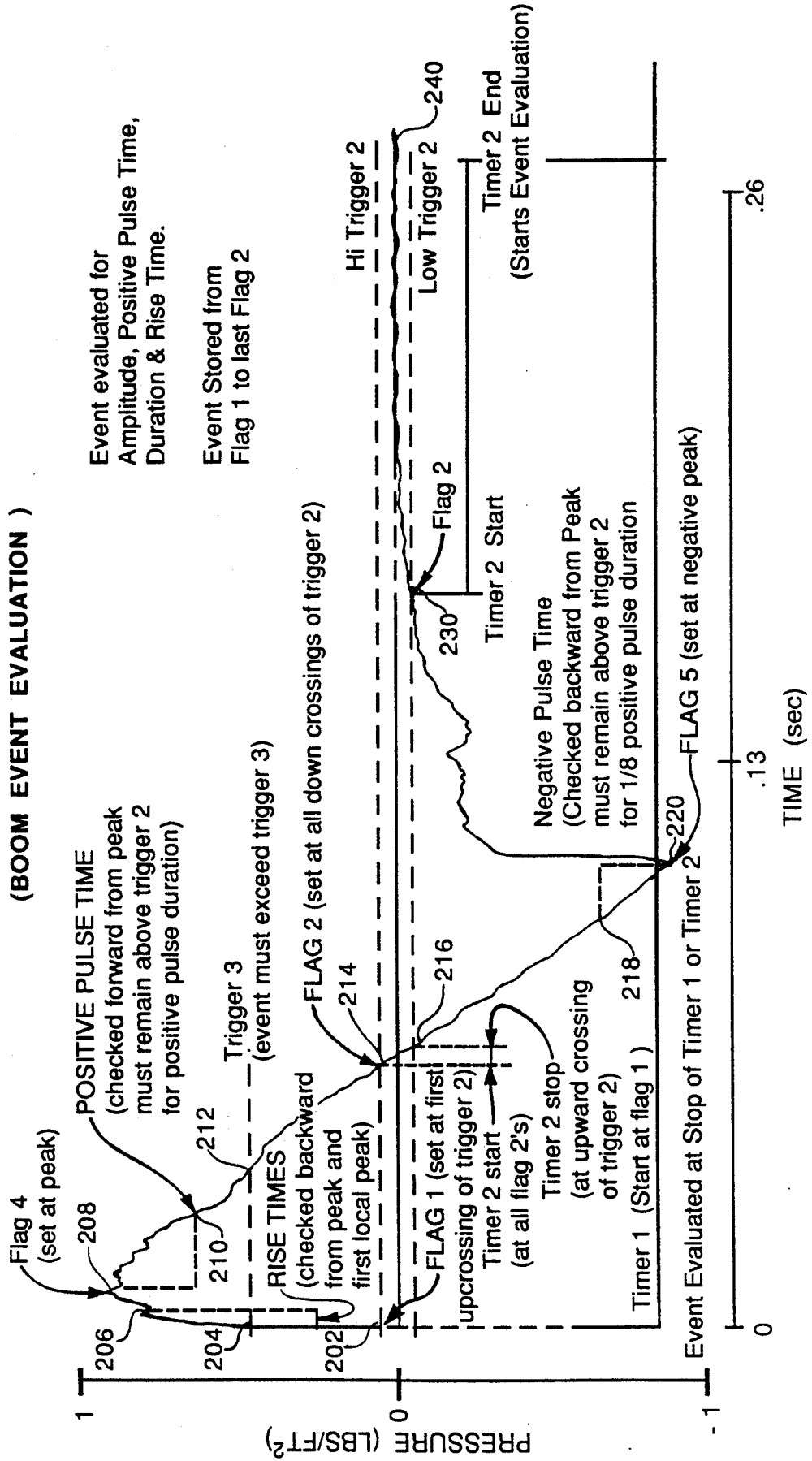
FIG. 2 is a graph showing how the BEAR uses a unique evaluation of level, duration, pulse time and risetime to screen out all non-boom or non-impulsive events.

With this variety in sonic boom signature the BEAR discerns the boom event from other noisy events with an internal boom screening methodology. The BEAR continuously monitors the noise environment digitizing and examining the noise signature every 125 microseconds. When the noise level rises above the Trigger 2 level the BEAR considers the signal a possible boom event and starts to write the digitized values to the RAM modules and starts the event timer. As the possible boom event is being stored, the BEAR flags the first local peak, the absolute peak and the last downward threshold (Trigger 2) crossing. Upon reaching a downward threshold crossing, the BEAR starts the cycle timer. Whenever the signal raises back above the threshold the cycle timer is stopped and reset again on the next down crossing. When either timer times out, the possible boom event is examined as follows: first, the peak level must be above the Trigger 3 level, second, during the time from the peak (positive and negative) to the peak time plus the pulse time (positive and negative) all the data points must be greater than the Trigger 2 level, third, the rise time to the absolute peak must be steeper than the input rise time values or the rise time to the first local peak must be steeper than one third of the input rise time value. Specifically, the rise time from the absolute peak is calculated by comparing the data value at the time of (the absolute peak time minus the input risetime time value) to the peak value. This data value must be less than the peak value minus the input rise time dB value. For the first local peak, the value to be compared is found at (the time of the first local peak minus one third of the input risetime time value). If either of these risetimes pass the test, then the possible boom event is considered to have a valid risetime. If the event passes all three of these tests, it is considered a valid boom; the "Yes" counter is incremented by one and the date, time, and parameter sets are stored with the event. If the event fails any of the three tests, it is not considered a valid boom; the "No" counter is incremented by one and the data are allowed to be overwritten by any new incoming data. FIG. 2 shows the valid boom evaluation criteria.

OVERVIEW

The Boom Event Analyzer Recorder (BEAR) is a software controlled instrument that digitizes sonic signals and analyzes the signals using programmable parameters to determine if the signal was a sonic boom. The data of an event are retained in the removable battery RAM modules 14 that can be later processed for further analyses. The software was written in 68000 assembler language. The devices that are being controlled are:

16 bit A/D being sampled at 8 Khz.
Keypad for parameter entry.
Alphanumeric display for parameter display and error messages.
Real-time clock for time and date information.
Two programmable timers for defining event windows.

The memory locations of these devices are shown on the BEAR address map FIG. 28.

Figure 7:
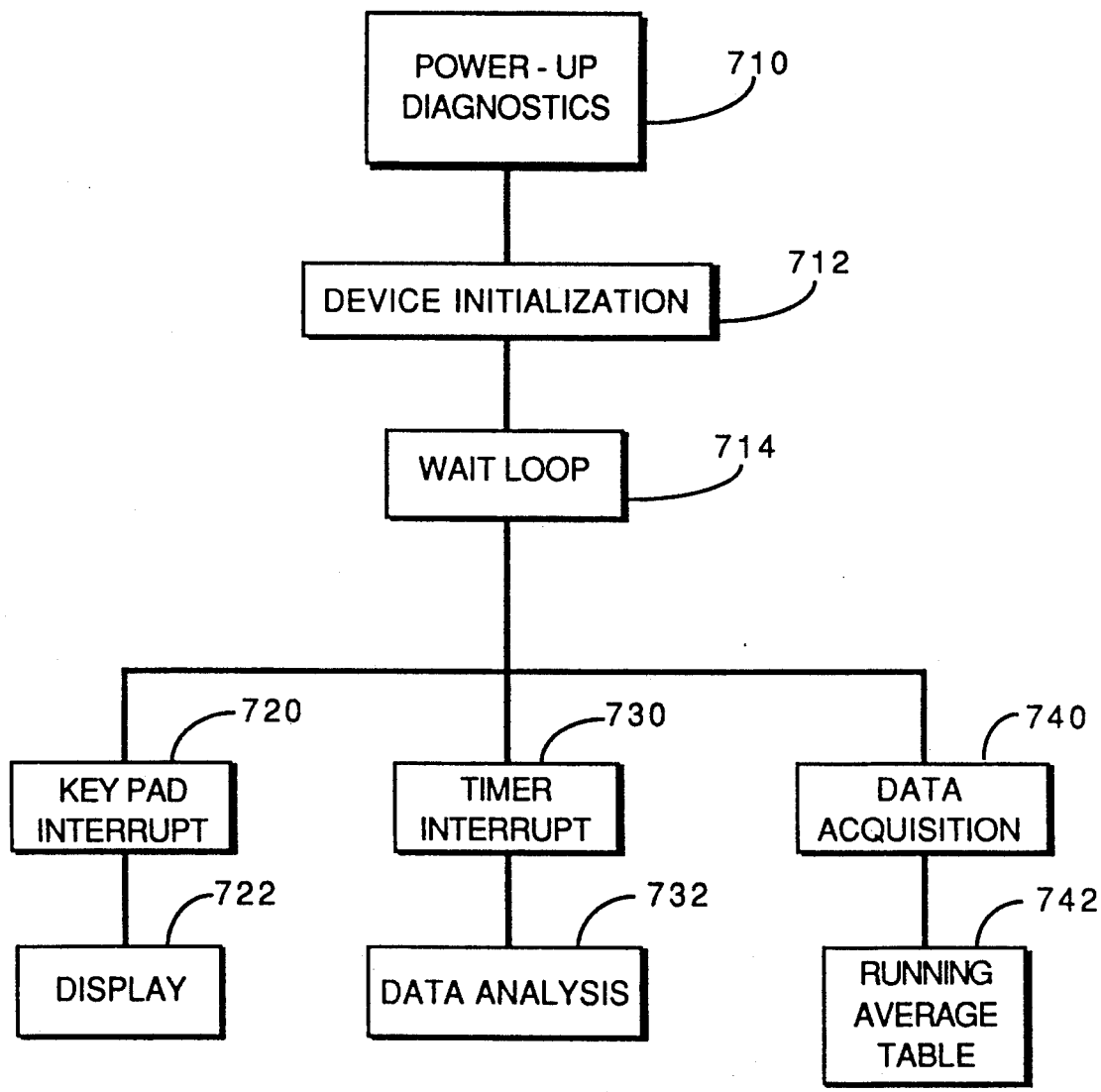
FIG. 7 is a BEAR software block diagram.

As described in the software block diagram of FIG. 7, at block 710 the system first performs diagnostics when the power is applied. Checks are made of the PROMS, static RAM, and battery RAM modules. An error message is displayed if the test fails. At block 712, the next function performed is the initialization of the display, timers, and the real-time clock. The timer and the real-time clock are initialized with the default parameters. The initial parameter list is also stored in the battery RAM 14. Finally, the interrupts are enabled and at block 714 the software goes into a wait loop for either an A/D interrupt at block 740, keypad interrupt at block 720, or a timer interrupt at block 730.

When a A/D interrupt is detected at block 740, the digitized data are read and compared to the threshold value. If below the threshold, the data are processed at block 742 by the running average table routine which averages the background noise to adjust the threshold. If the data are above the threshold, a new event is triggered and data recording begins. At the beginning of the event, timers 1 and 2 are activated to determine the end of the event.

When a keypad interrupt is detected at block 720, "KEYPAD" reads and parses the key entered. The first key that must be entered is the display on/off key (*). While the display is on, the A/D interrupt routine (DAC) does not process A/D data. The next key that must be entered is a function key. The allowable functions are:

Set Real-Time Clock.
Set Status and Timers.
Enter Calibration Mode.
Set Soft Values.
Full System Reset.

Once the function key is entered, the current values for that function are displayed (block 722). If new parameter values are to be entered, the "ENT" key must be pressed followed by the values. All parameter changes are recorded in battery RAM for analysis purposes. If parameter changes are not required the on/off key (*) may be pressed; the display is turned off; and the sonic data continues to be processed. If any invalid keypad entry is detected, "KEYPAD" will display an error message.

When a timer interrupt is detected, it indicates the end of an event. The event is analyzed to determine if it was valid sonic boom or not. Either timer 1 or 2 will cause the interrupt to occur. The other tests performed in validating the data are: the peak signal must be high enough, the pulse time both positive and negative must be long enough, and the slope of the peak must be fast enough. If the event is determined to be a valid sonic boom, the data are retained and the current time and data along with the running average value are recorded at the end of the data file. The "YES" event message counter is also incremented. If the event was invalid, the data file pointer is reset to the beginning of the file, and the next event will record over the data. The "NO" event message counter is also incremented. Events will continue to be recorded until the battery RAM 14 is filled at which time the "BAT RAM FULL" message is displayed and event processing is halted. If any errors are detected by the system during power-up diagnostic or parameter entry, appropriate error messages are displayed. All error recovery procedures are explained in the manual.

SYSTEM INITIALIZATION

Figure 8:
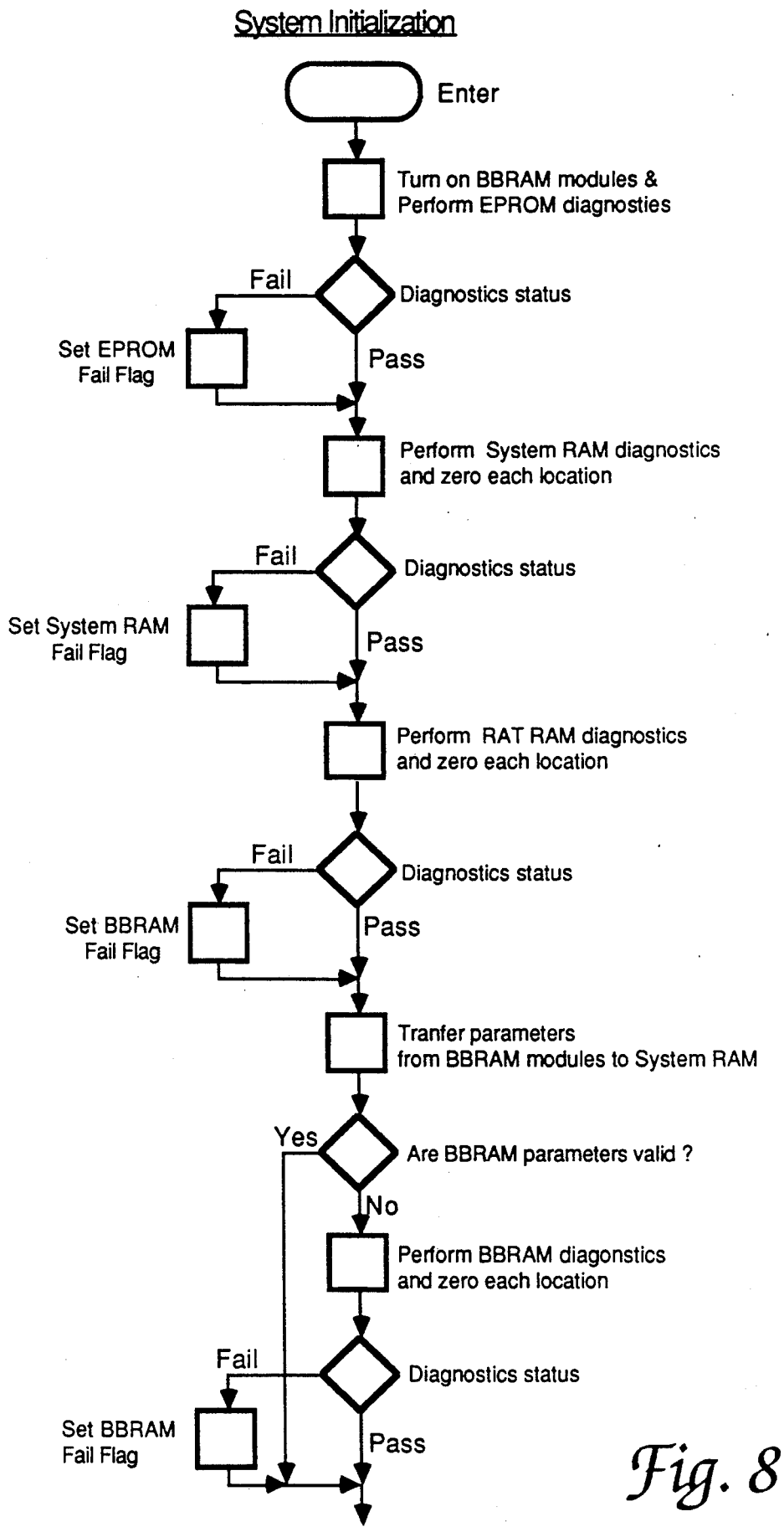
FIGS. 8, 9 and 10 are flow charts of the program routines for system initialization.
Figure 9:
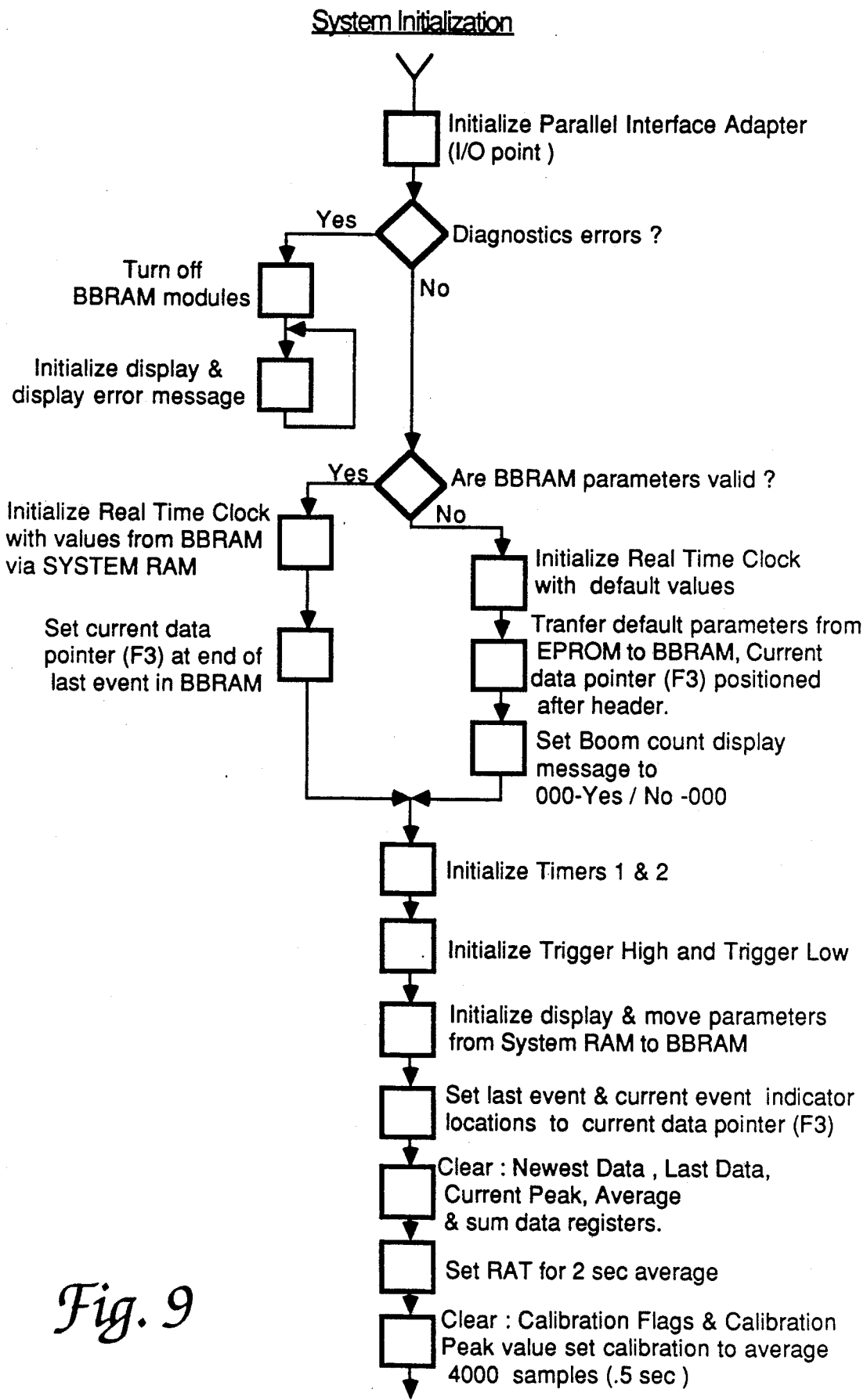
Figure 10:
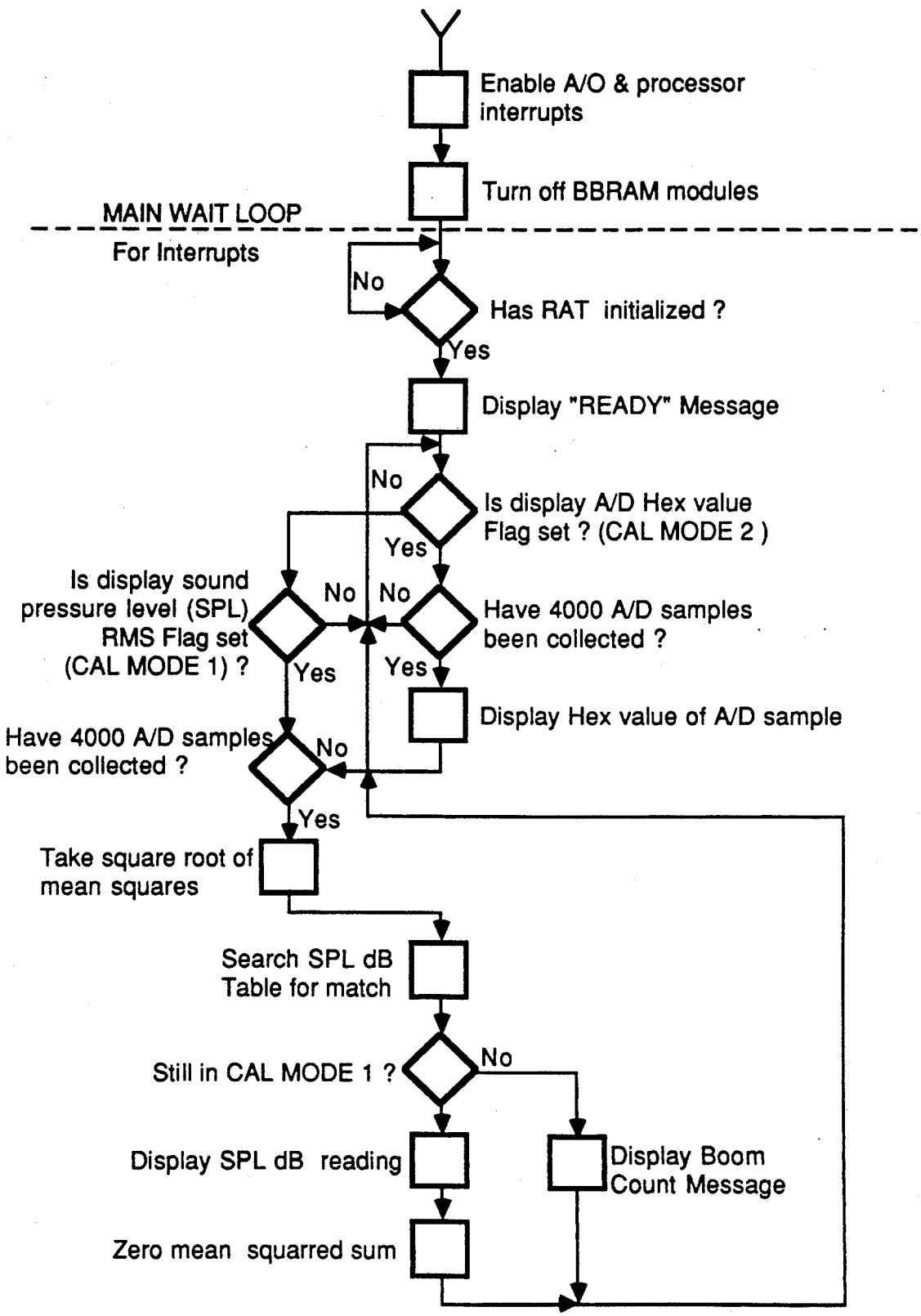

FIGS. 8, 9 and 10

The program routines for system initialization corresponding to blocks 710, 712 and 714 of FIG. 7 are shown in FIGS. 8, 9 and 10. The BEAR software program had two methods of initializing the system. If the system was powered on with new battery RAM modules installed or the operator initiated the "SYSTEM RESET" function code "E," the EPROMs are checked, the battery RAMS are checked and zeroed, the static RAM is checked, and the I/O devices are initialized. If the BEAR system is powered on with valid data existing in the battery RAM modules; the battery RAM diagnostic is bypassed and the system is initialized with the parameter values that existed when the BEAR was powered off. Data storage then begins after the barker code of the last valid data block in the battery RAM. The first device that is checked is the EPROM. The program sums each location in EPROM and compares the check-sum result with the predetermined value. Next, each byte of static RAM is written with the values AAH, 55H, and zero to verify its integrity. Finally, each byte of battery RAM is written with the values AAH, 55H, and zero. During the battery RAM test, two things are achieved: integrity check of the RAM and zeroing of the RAM. If any errors occur during the diagnostic, an error message is displayed. Once the diagnostics are passed, the program transfers the system constants from either the EPROM or battery RAM (depending on the type of initialization) to static RAM for use by the other routines in the system.

The next device to be initialized is the Peripheral Interface Adapter (PIA) chip. This allows I/O transfer between the CPU and the display, keyboard, real-time clock, and the timers. This also determines the circumstances for generating an interrupt. Once the PIA is initialized, the real-time clock, timers, and display are initialized. Finally, the interrupts are enabled and the system waits for any interrupts to occur. The possible interrupts and their vectors are:

Vector 2, DAC, A/D Interrupt
Vector 3, LITING, Lightning Interrupt (no operation)
Vector 5, KEYPAD, Keypad Interrupt
Vector 6, TIMER, Timer Interrupt

A/D INTERRUPT ROUTINE (DAC)

Figure 11:
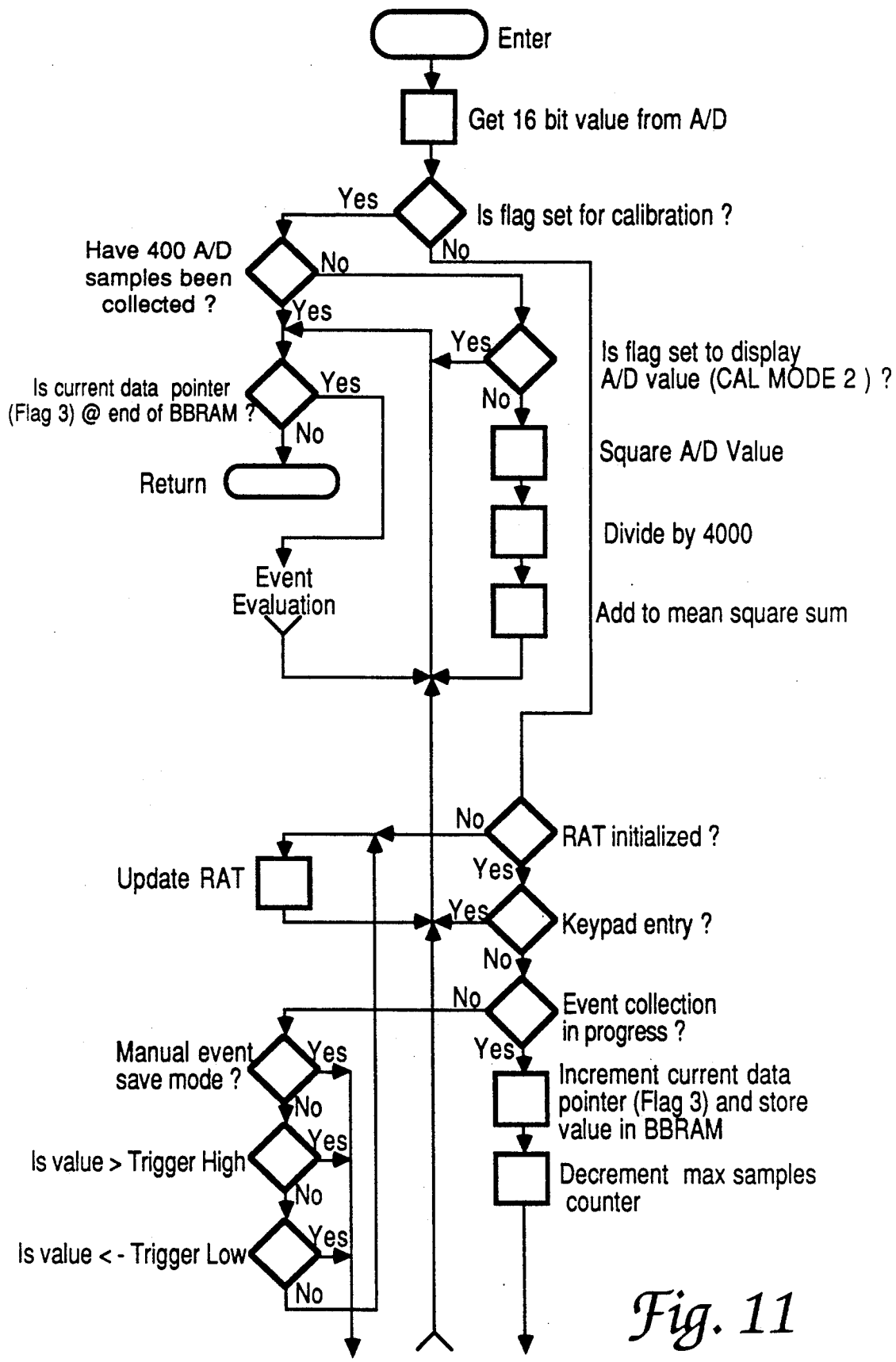
FIGS. 11, 12 and 13 are flow charts of the program routines for A/D interrupt service.
Figure 12:
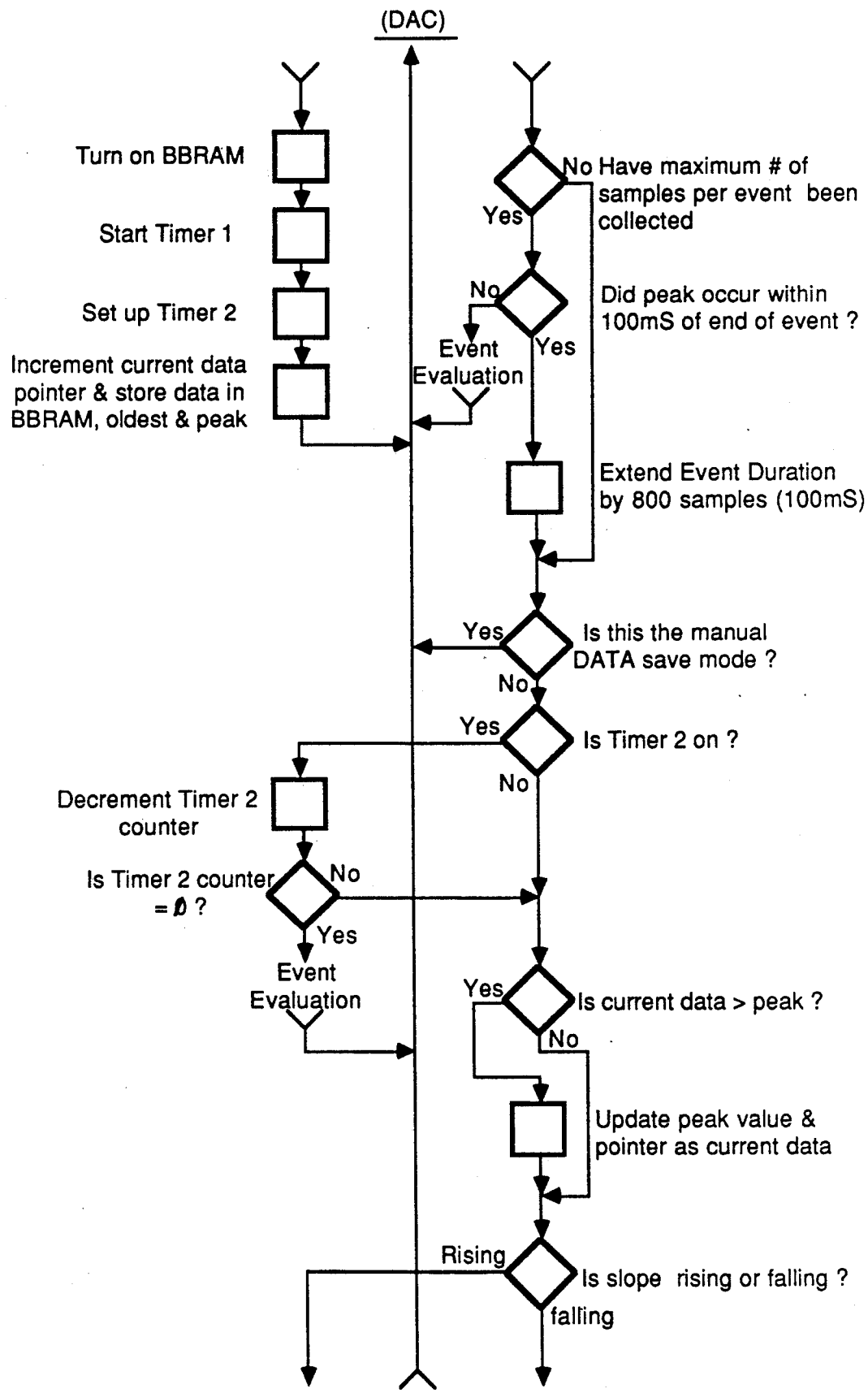
Figure 13:
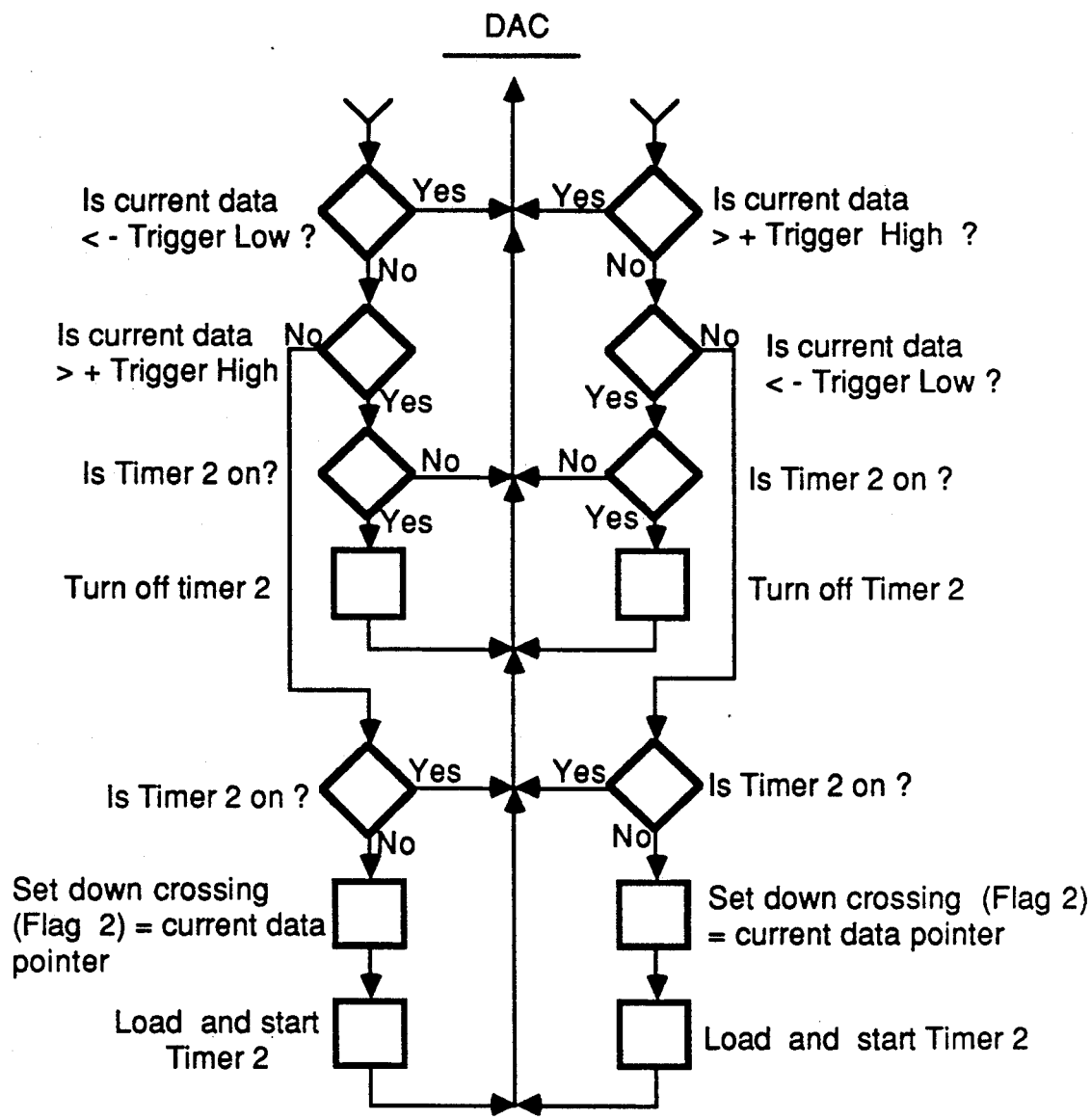
Figure 14:
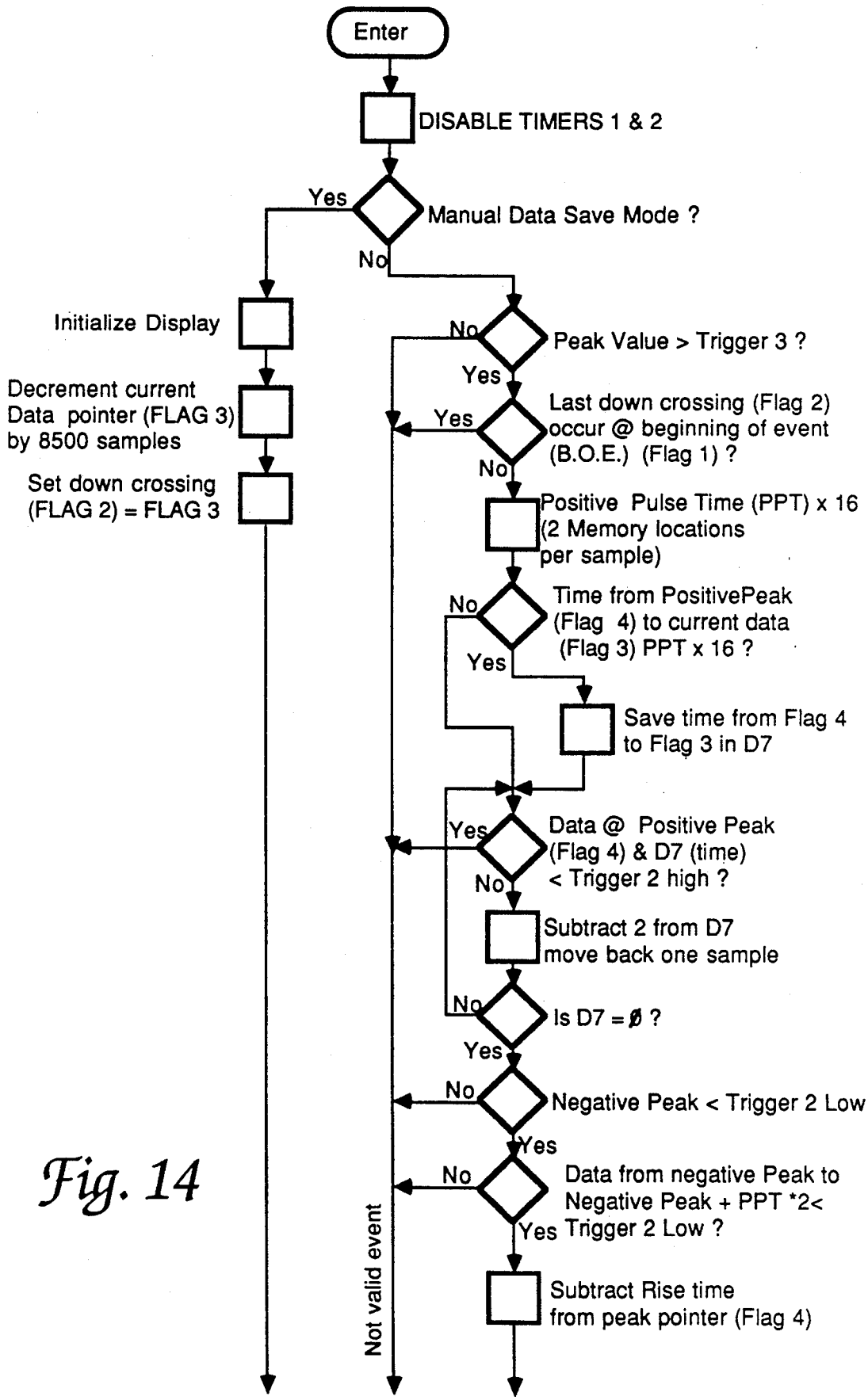
FIGS. 14-19 inclusive are flow charts of the event evaluation routines.
Figure 15:
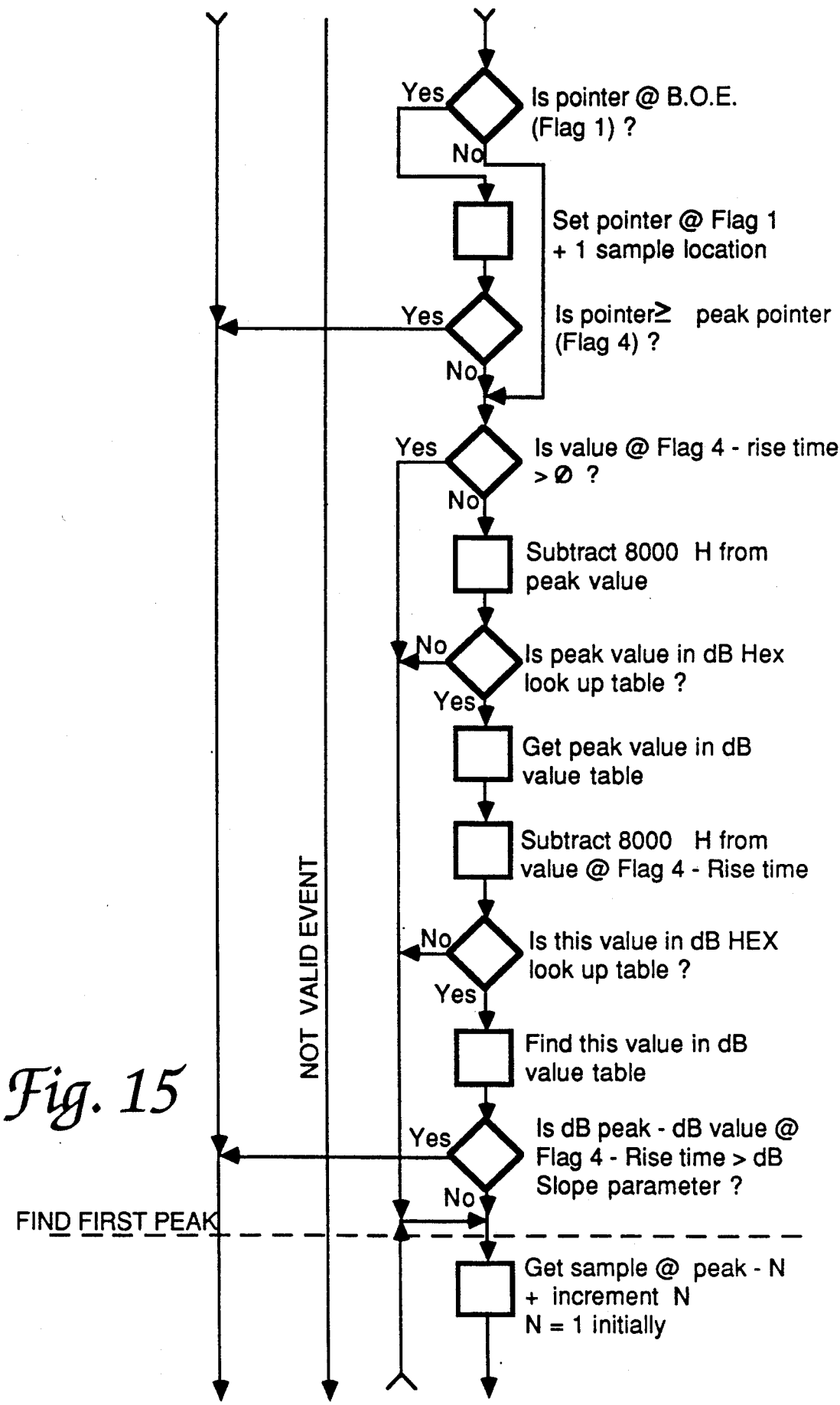
Figure 16:
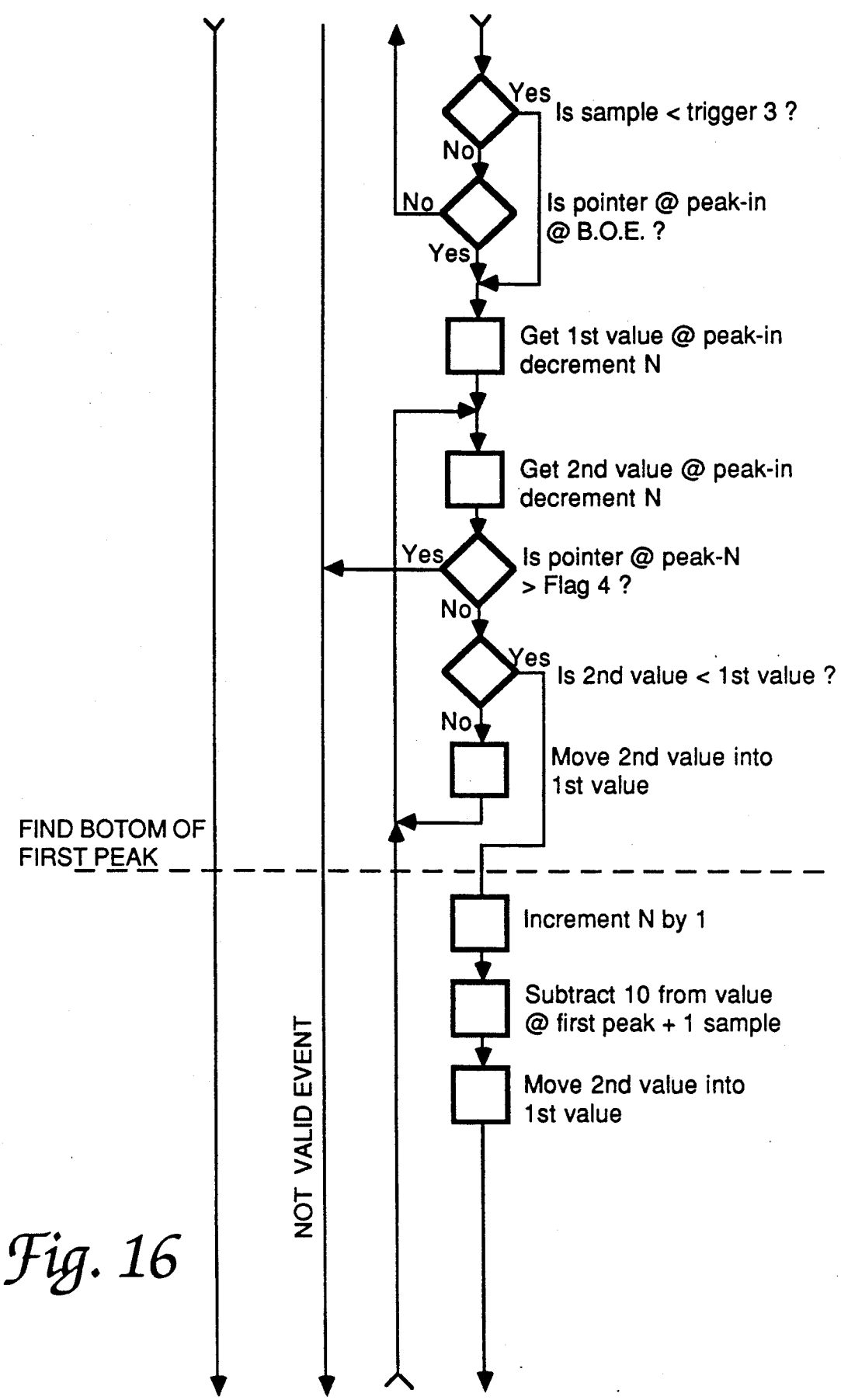
Figure 17:
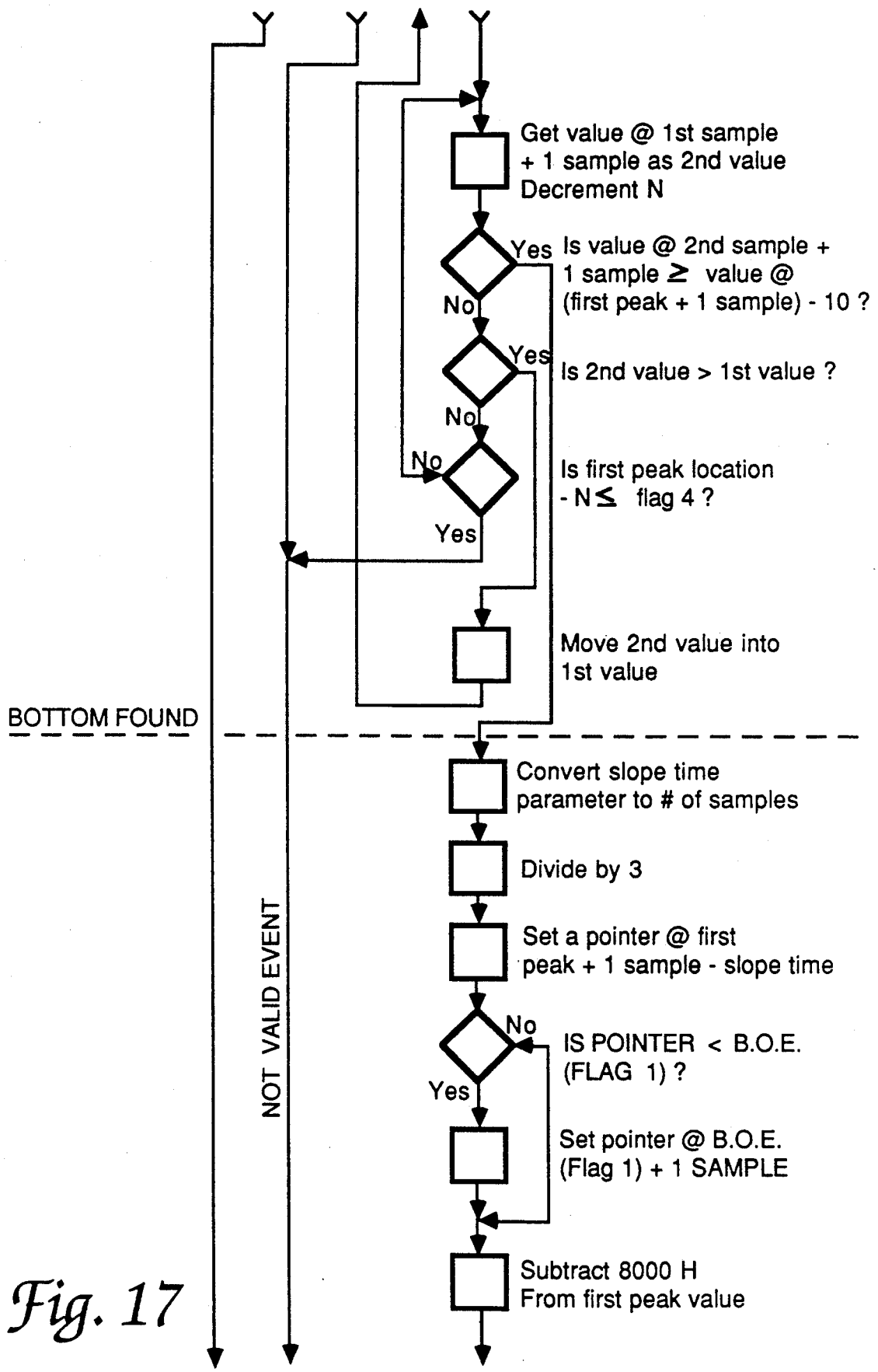
Figure 18:
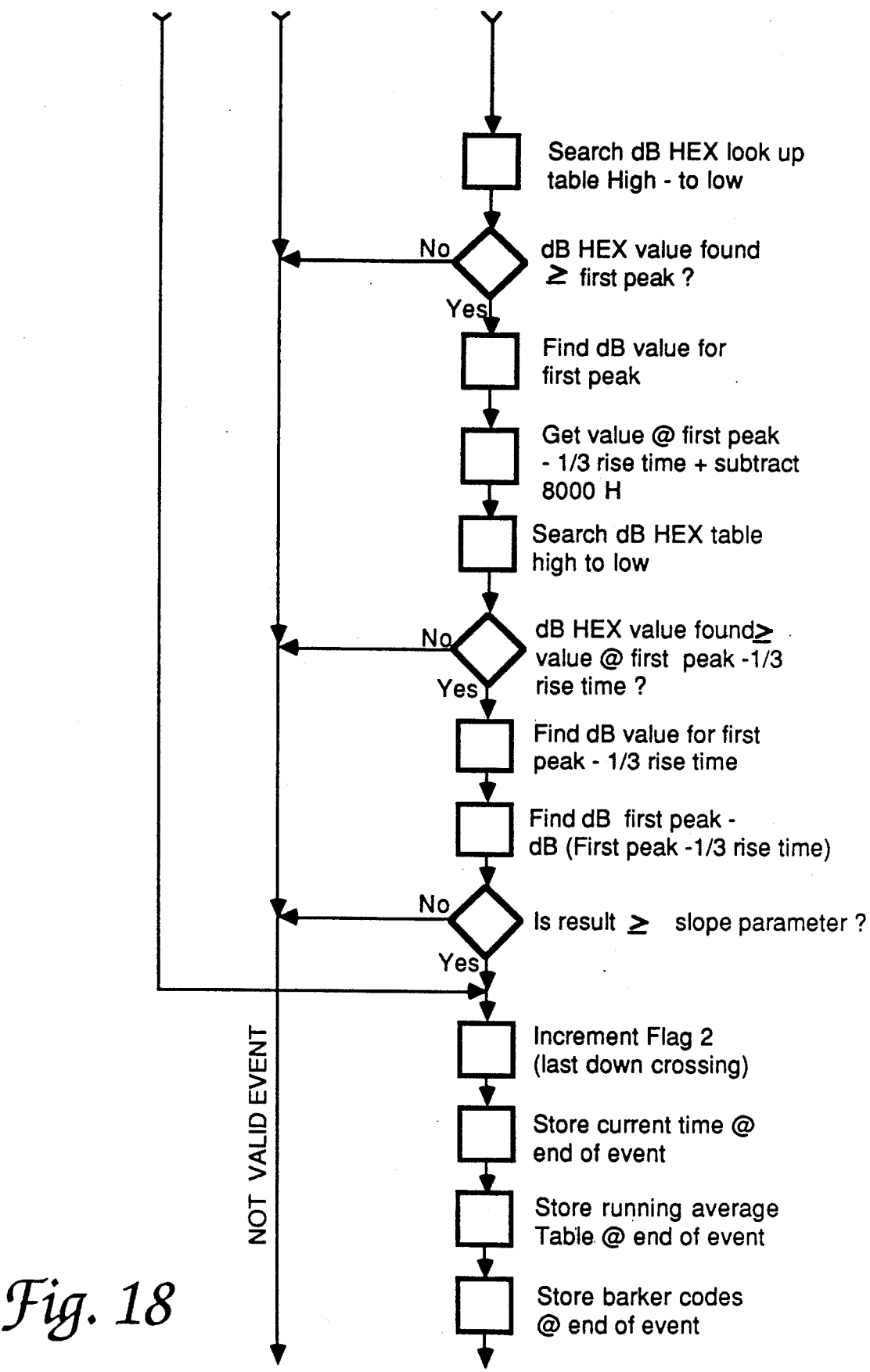
Figure 19:
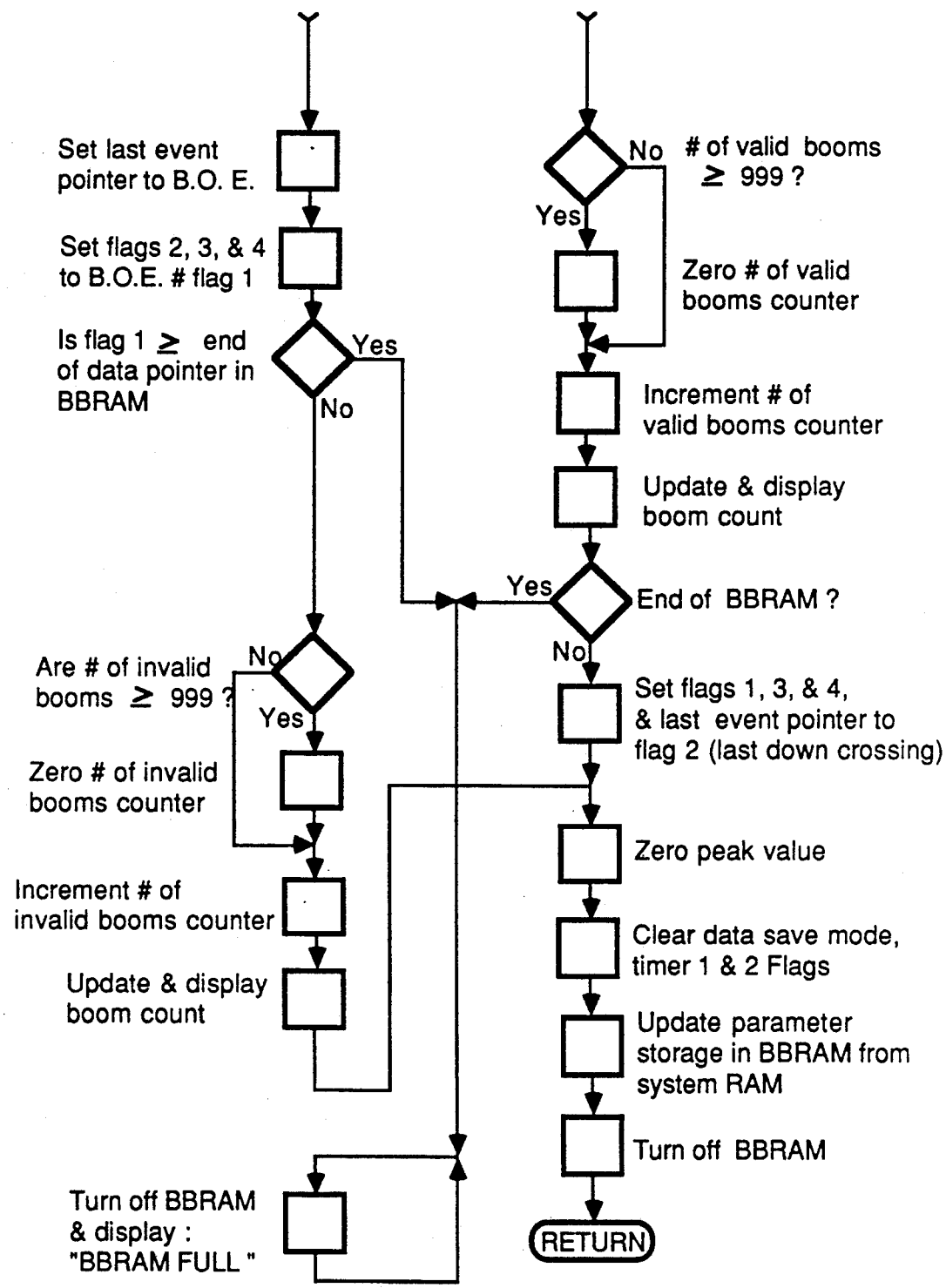

The program routines for A/D interrupt service corresponding to block 740 of FIG. 7 are shown in FIGS. 11, 12 and 13. The data acquistion (DAC) routine reads the A/D data on an interrupt. These interrupts occur every 125 μs so this routine must process the data quickly. The purpose of DAC is to determine if an event is occurring. If DAC determines an event is not occurring, the data are processed by running average table (RAT) which maintains a running average. If an event is occurring, DAC compares the data with the predetermined parameters (TRIGGER 1, TRIGGER 2, TRIGGER 3) to know when to activate the timers. The event evaluation routines are shown in FIGS. 14-19 inclusive. DAC also keeps track of the peak value during the event. This is performed by the timer interrupt routine (TIMER) block 730. All data read during an event are stored in battery RAM in count format.

RUNNING AVERAGE TABLE (RAT)

Figure 20:
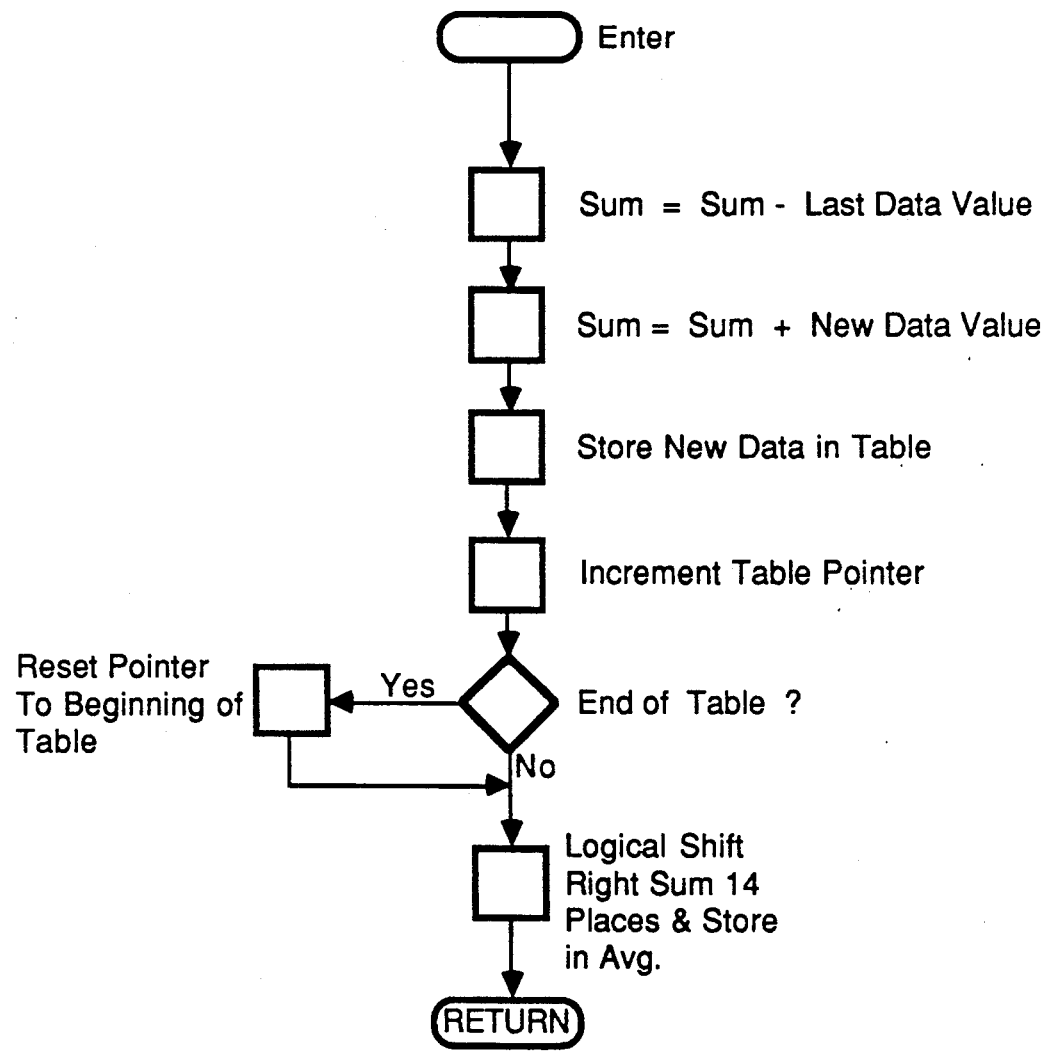
FIG. 20 is a flow chart of the program routine for the running average table.

The program routine for the running average table corresponding to block 742 of FIG. 7 is shown in FIG. 20. During the power-up diagnostics, the battery RAM modules are checked and each location is set to zero. Since there can be a variable number of modules implemented, the end of RAM is determined and that address is saved in ENDRAT. The beginning of the average table is at the address 16,384.

The address of the beginning of the table is maintained in register A5 and the latest table pointer in A6. The running average is maintained in register D3 with the moving sum in D4. The average is used by the DAC routine to determine when an event is beginning.

TIMER INTERRUPT ROUTINE (TIMER)

Figure 21:
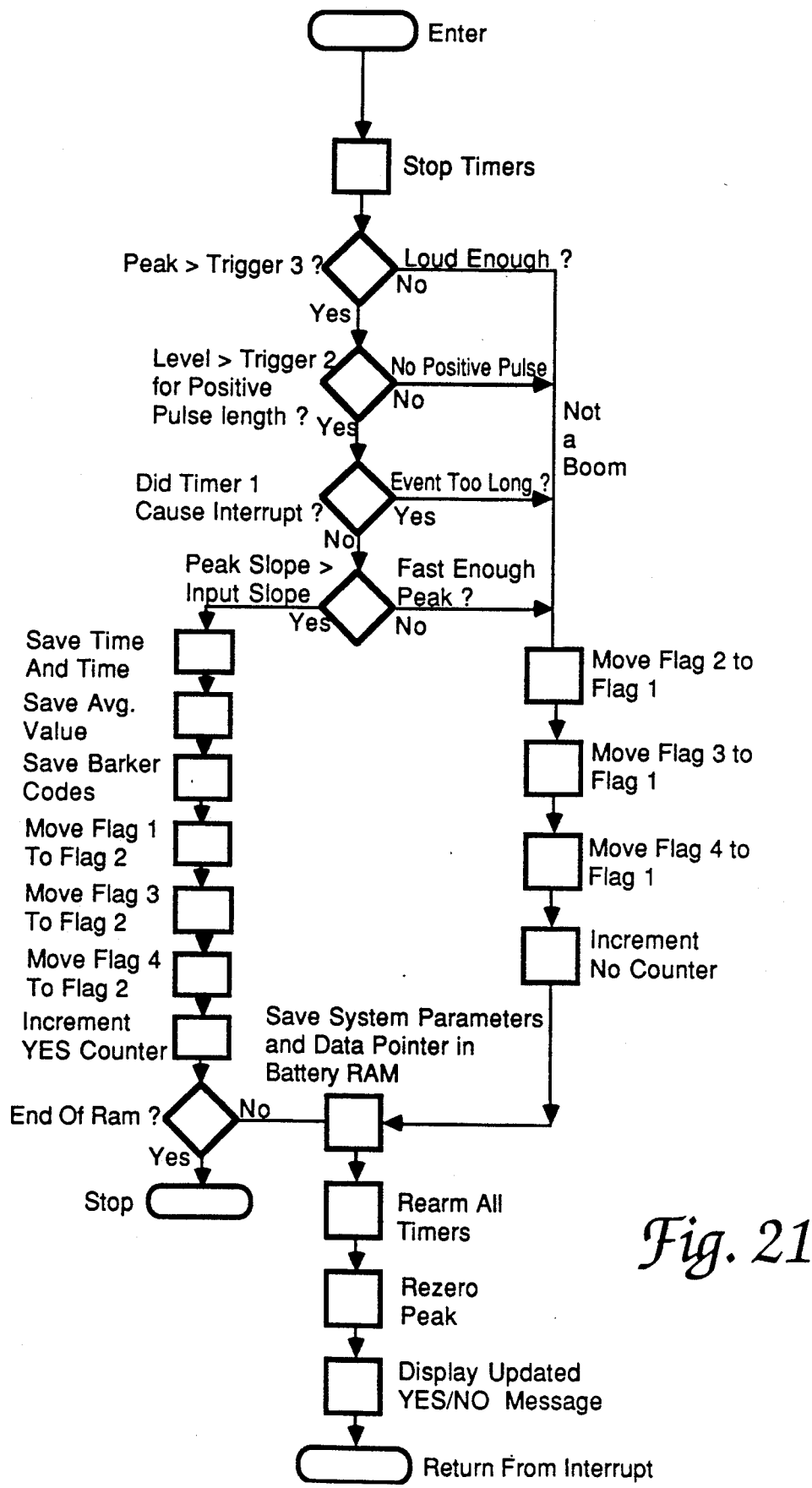
FIG. 21 is a flow chart of The program for the timer interrupt routine.
Figure 22:
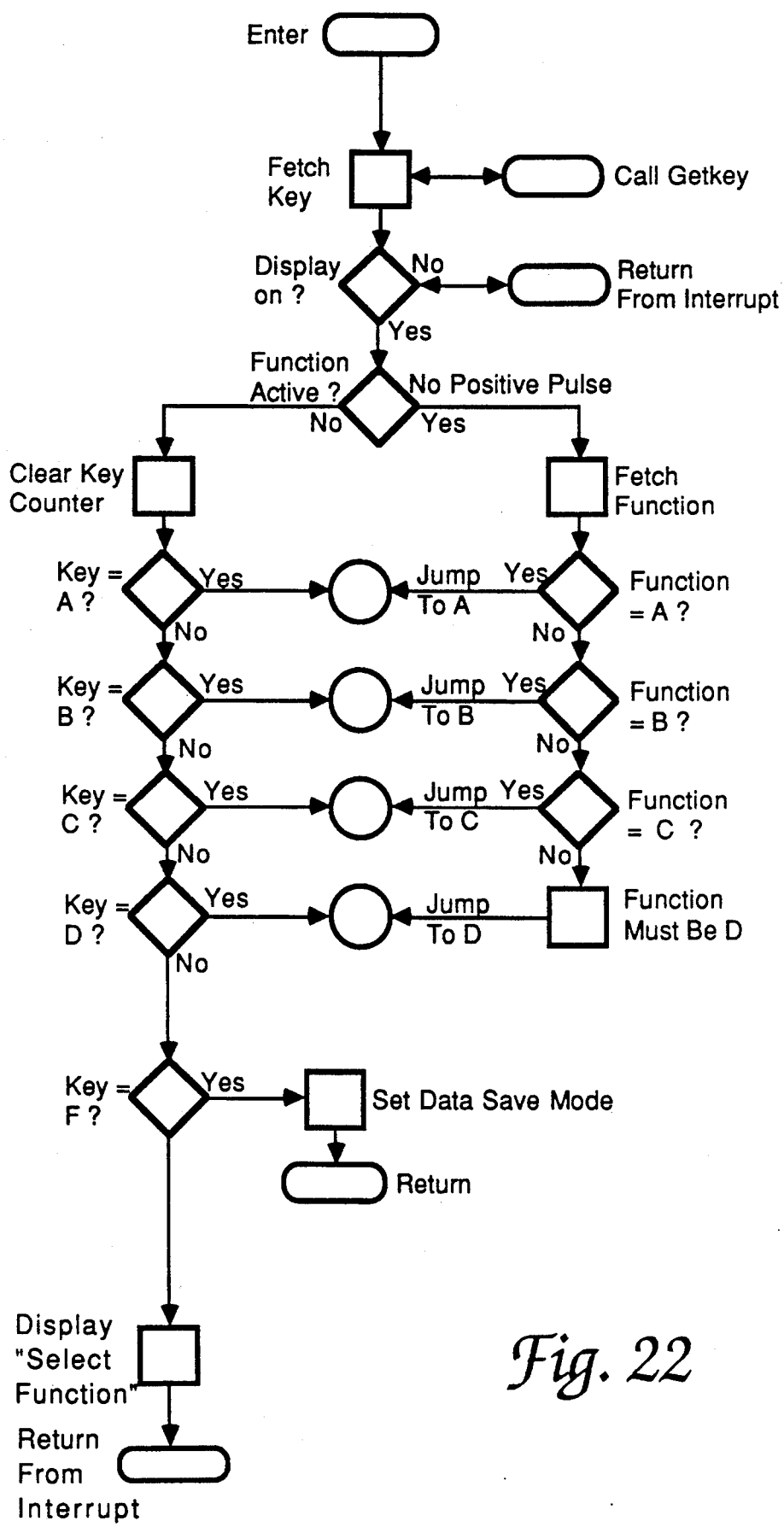
FIGS. 22-27 are flow charts of the program for the timer interrupt routine.
Figure 23:
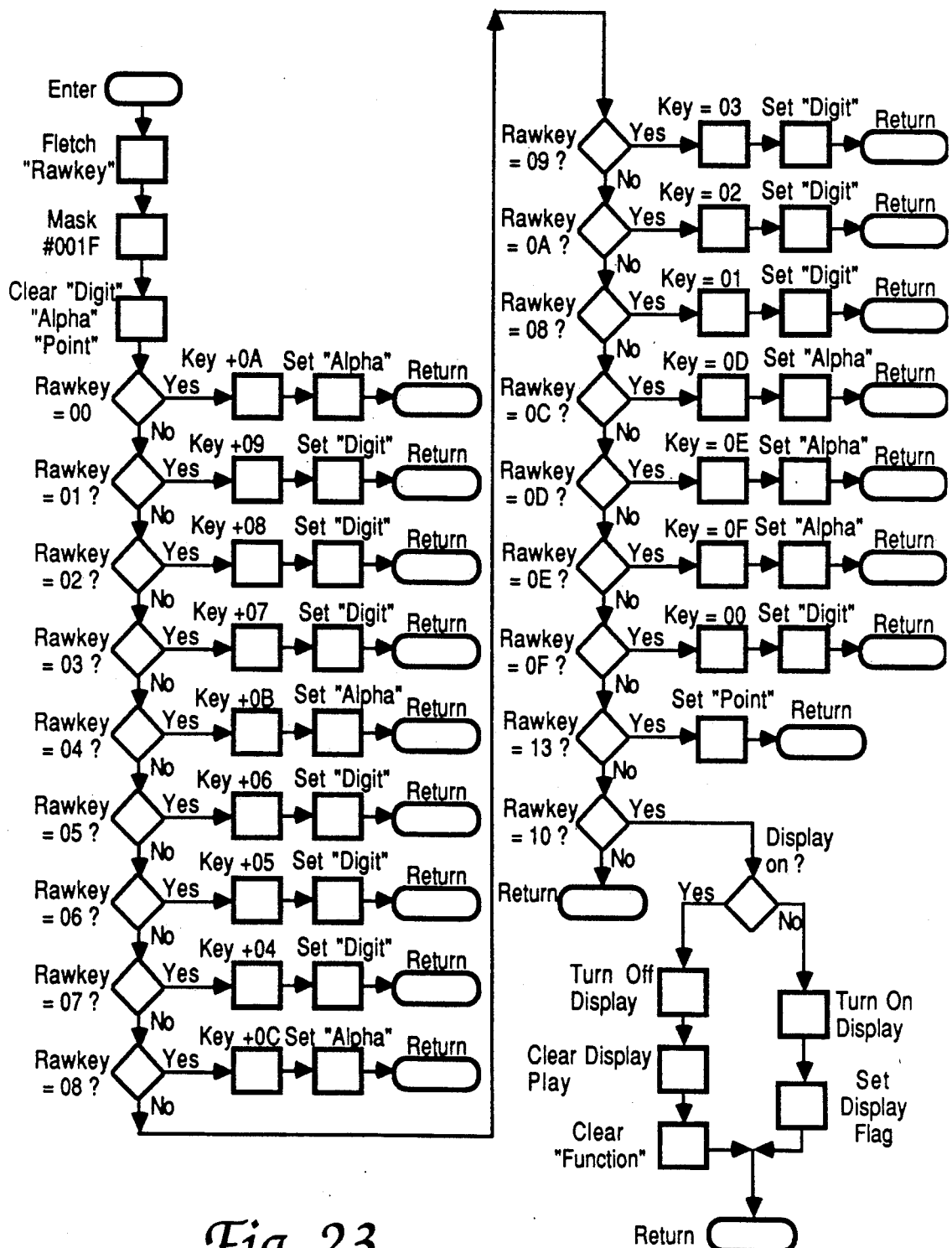
Figure 24:
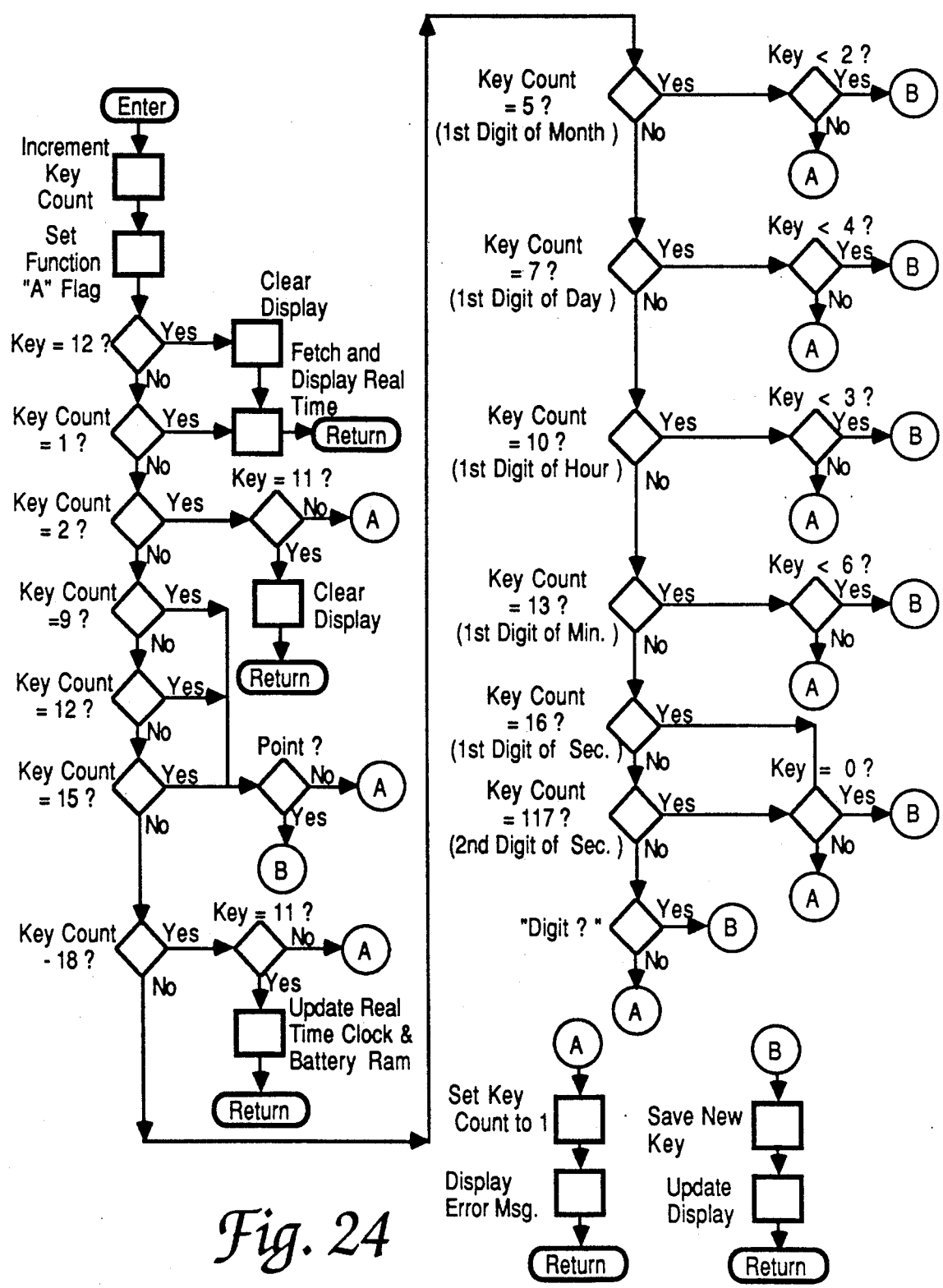
Figure 25:
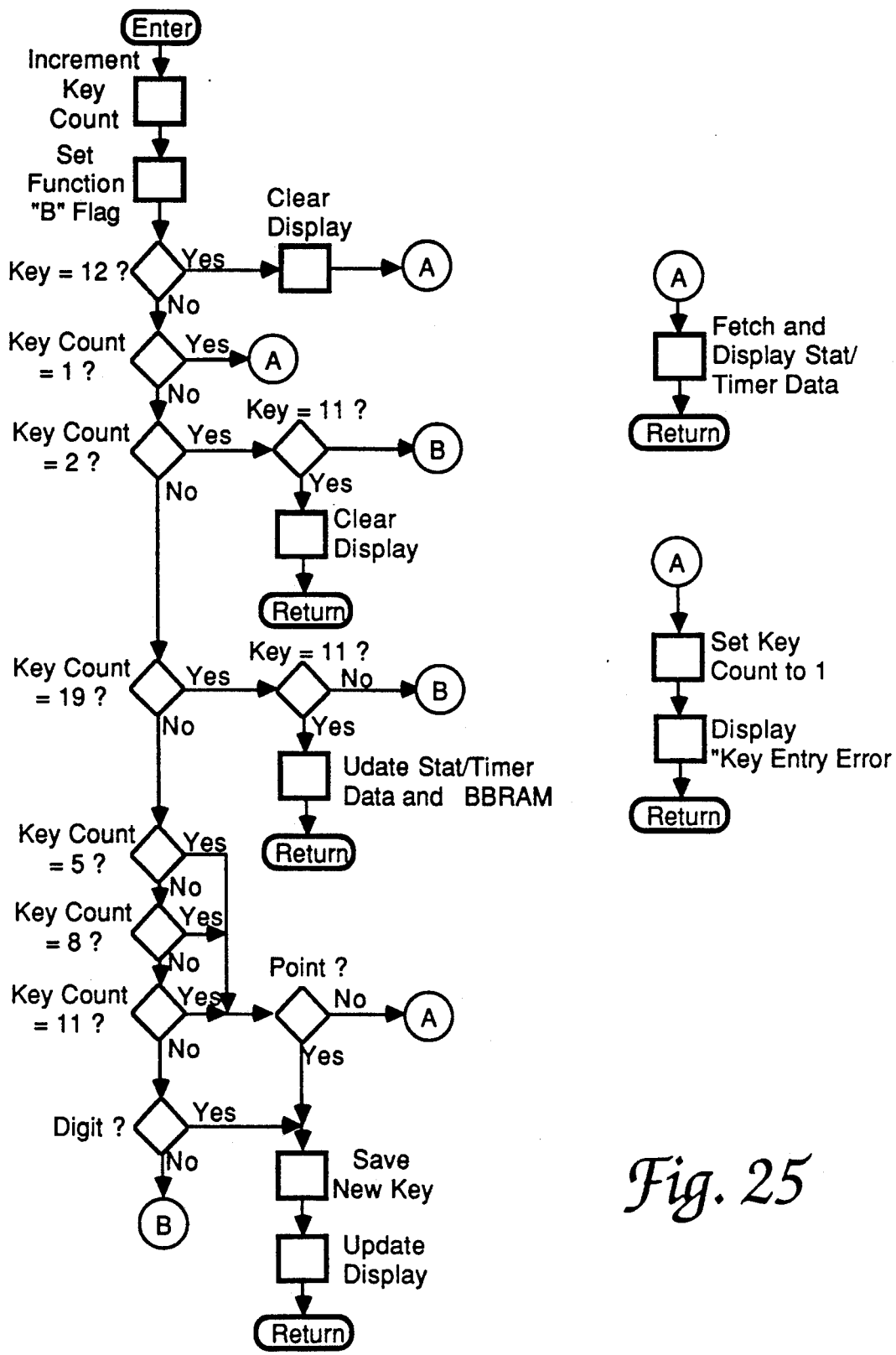
Figure 26:
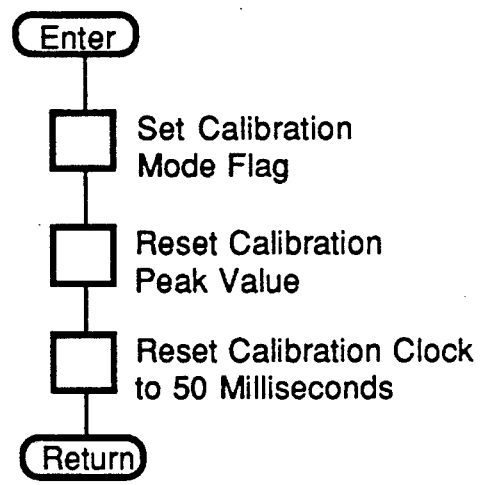
Figure 27:
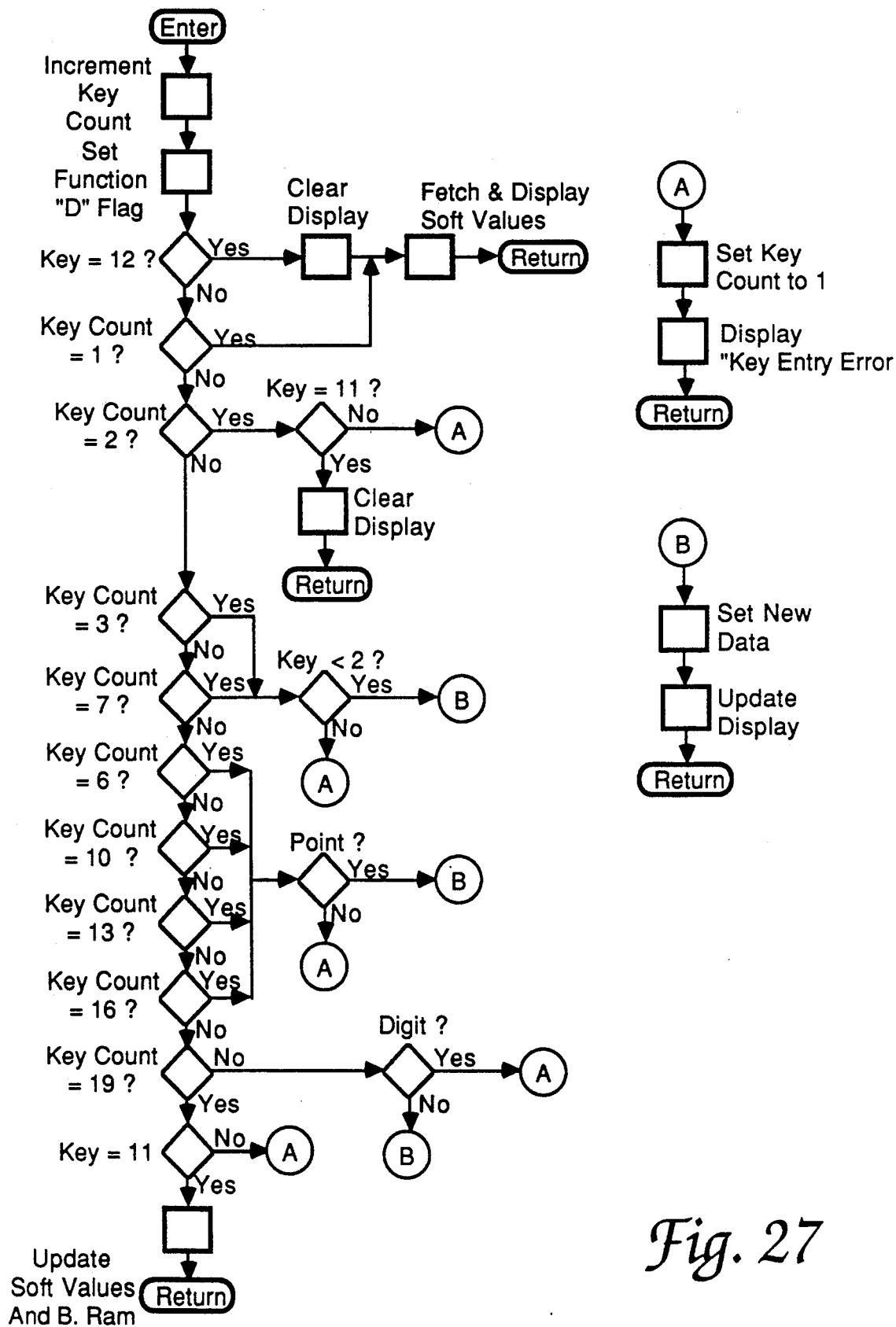

The program for the timer interrupt routine corresponding to block 730 of FIG. 7 is shown in FIG. 21. The TIMER routine services the timer interrupt which is used to trigger an end of an event. There are two timers which can generate an interrupt: Timer 1 which is started at the beginning of an event and Timer 2 which is started at a downcrossing point. Once the interrupt occurs, TIMER analyzes the data to determine if the event was a sonic boom. There are several parameters that are checked to validate the event. They are:

Sufficient Peak Value
Positive Peak Duration
Peak Slope Was Fast Enough

If the event was valid, the time, date, and average is stored after the data followed by three barker codes. If the event was invalid, TIMER resets the data pointers to the beginning of the event and the next event is recorded over top. Finally, the YES or NO event counter is incremented and the updated YES/NO message is displayed. Before exiting the timer routine, the system parameters and data pointer is saved in battery RAM.

KEYBOARD INTERRUPT ROUTINE (KEYPAD)

The program for the timer interrupt routine corresponding to block 720 of FIG. 7 is shown in FIGS. 22-27. The KEYPAD routine services the interrupt generated by a keypad entry. It interprets the key by calling GETKEY (FIG. 23) and processes the function that is requested (FIGS. 24-27). The functions available in the BEAR are:

| FUNCTION CODE | DESCRIPTION |
| --- | --- |
| A | Set time and date. |
| B | Set ID and timer values (Test No., Site No., Serial No., Timer 1, and Timer 2). |
| C | Set Callibration. |
| D | Set soft values: (Trigger 3, Trigger 2, Pulse Value Rise time dB, and Rise Time |
| F | Save Data Mode |

Once the function code is entered, KEYPAD determines if the values entered are valid. If an incorrect value is entered, an error message is displayed. The KEYPAD routine outputs the entered data to the display to provide operator feedback. Once the last entry is made, the system parameters are updated with the new values and a change message is formulated and stored in battery RAM as well as a copy of all systems parameters. Once the display is turned on by entering "*," data acquisition is bypassed to prevent data analysis to be performed with invalid parameters.

INITIALIZATION DATA FORMAT

The following example illustrates some typical data formats for different types of events occurring in the BEAR.

The first event to occur following application of power to the BEAR is the initialization diagnostics. Following their successful completion, the working cache SRAM is loaded with the default working parameters. Then the following data set is loaded into the first RAM module pair (least significant address shown first). These values mostly represent the default parameters. Please note that only on the very first writing of Barker codes is there a set of five. All other events, be they sonic boom or keypad entry events, are always separated by a set of three Barker codes, which are always preceded by a three word group of data representing the current real-time.

| HEX VALUE | MSB | LSB | |
| --- | --- | --- | --- |
| EB90 | $11101011_2$ | $10010000_2$ | Barker Code |
| EB90 | $11101011_2$ | $10010000_2$ | Barker Code |
| EB90 | $11101011_2$ | $10010000_2$ | Barker Code |
| EB90 | $11101011_2$ | $10010000_2$ | Barker Code |
| EB90 | $11101011_2$ | $10010000_2$ | Barker Code |

-continued

| HEX VALUE | MSB | LSB | | |
|---|---|---|---|---|
| 000 | $00010000_2$ | $00000000_2$ | Test Number = 00[10] | 00010000xxxxxx (any number 00–99[10]) |
| 2000 | $01000000_2$ | $00000000_2$ | Site Number = 00[10] | 001000000xxxxxx (any number 00–99[10]) |
| 30xx | $00110000_2$ | $0xxxxxxx_2$ | BEAR Serial Number | (any number 00–3999[10]) |
| 4000 | $01000000_2$ | $00000000_2$ | Flag Word for Timer #1 | The next word contains the Timer #1 count value (00–49500[10]) |
| 03E8 | $00000011_2$ | $11101000_2$ | Timer #1 Default Value of 1000[10] | |
| 5000 | $01010000_2$ | $00000000_2$ | Flag Word for Timer #2 | The next word contains the Timer #2 count value (00–49500[10]) |
| 09C4 | $00001001_2$ | $11000100_2$ | Timer #2 Default Value of 2500[10] | |
| 600A | $01100000_2$ | $00001010_2$ | Positive = 10[10] Pulse | 011000000xxxxxx (any number 00–99[10] |
| 7000 | $01110000_2$ | $00000000_2$ | Flag Word for Trigger #2 | The next word contains the Trigger #2 value (0–32767[10]) |
| 0020 | $00000000_2$ | $00010010_2$ | Timer #2 Default of Value 1200 dB | 0xxxxxxxxxxxxxxx |
| 8000 | $00000000_2$ | $00000000_2$ | Flag Word for Trigger #3 | The next word contains the Trigger #3 value (0–32767[10]) |
| 0067 | $00000000_2$ | $00101000_2$ | Trigger #3 Default value of 107 dB | 0xxxxxxxxxxxxxxx |
| 9005 | $10010000_2$ | $00000110_2$ | Peak Slope Rise dB Default = 6 | 100100000xxxxxx (any number 00–99[10]) |
| 9002 | $10010000_2$ | $00100011_2$ | Peak Slope rise | 101000000xxxxxx Time = 35 msec any number 00–99[10]) |
| xxxx | $xxxxxxxx_2$ | $xxxxxxxx_2$ | Real-Time Minutes and seconds | |
| xxxx | $xxxxxxxx_2$ | $xxxxxxxx_2$ | Real-Time: Days and Hours | |
| xxxx | $xxxxxxxx_2$ | $xxxxxxxx_2$ | Real-Time: Years and Months | |
| EB90 | $11101011_2$ | $10010000_2$ | Barker Code | |
| EB90 | $11101011_2$ | $10010000_2$ | Barker Code | |
| EB90 | $11101011_2$ | $10010000_2$ | Barker Code | |

EVENT DATA FORMAT

The next example is that of a partial listing of any actual event which would be saved assuming the use of the default parameters in the system. Note that the length of an actual event is always very long (greater than ten data points) when compared to a keypad event. Also, the last data point just after the real-time clock information is the average value from the running average table just prior to the recording of this event. This piece of information is the only data not retrievable from the system data for post test analysis and is included here for analysis purposes. All data are stored in raw A/D counts.

| HEX VALUE | BINARY VALUE OF VOLTAGE | DESCRIPTION |
|---|---|---|
| EB90 | 1110101110010000 | Barker Code |
| EB90 | 1110101110010000 | Barker Code |
| EB90 | 1110101110010000 | Barker Code |
| 0010 | 0000000000010000 | First Data Point (voltage value for 90 dB) |
| . . | | |
| 0041 | 0000000001000001 | |
| 05B7 | 0000010110110111 | |
| 392C | 0011100100101100 | Peak Value (voltage value for 148 dB) |
| . . | | Other Data Points for Recorded Sonic Boom Event |

-continued

| HEX VALUE | BINARY VALUE OF VOLTAGE | DESCRIPTION |
|---|---|---|
| 000C | 0000000000001100 | |
| 0006 | 0000000000000110 | Last Data Point (voltage value for 81 dB) |
| xxxx | xxxxxxxxxxxxxxxx | Real-Time: Minutes and Seconds |
| xxxx | xxxxxxxxxxxxxxxx | Real-Time: Days and Hours |
| xxxx | xxxxxxxxxxxxxxxx | Real-Time: Years and Months |
| 0000 | 0000000000000000 | (2 seconds Average Noise Level Prior to this event (voltage value for 64 dB) |
| EB90 | 1110101110010000 | Barker Code |
| EB90 | 1110101110010000 | Barker Code |
| EB90 | 1110101110010000 | Barker Code |

The following is an example of a change in the trigger #3 parameter to valve of 137 dB.

| HEX VALUE | MSB | LSB | |
|---|---|---|---|
| EB90 | $11101011_2$ | $10010000_2$ | Barker Code (previous event's Barker Code, not to be rewritten) |
| EB90 | $11101011_2$ | $10010000_2$ | Barker Code |
| EB90 | $11101011_2$ | $10010000_2$ | Barker Code |
| 8000 | $10000000_2$ | $00000000_2$ | Flag Word for Trigger #3 The next word contains the Trigger #3 Value (0-32767[10]) |
| 1111 | $00010001_2$ | $00010001_2$ | Trigger #3 Value of 137 dB |
| xxxx | $xxxxxxxx_2$ | $xxxxxxxx_2$ | Real-Time: Minutes and Seconds |
| xxxx | $xxxxxxxx_2$ | $xxxxxxxx_2$ | Real-Time: Days and Hours |
| xxxx | $xxxxxxxx_2$ | $xxxxxxxx_2$ | Real-Time: Years and Months |
| EB90 | $11101011_2$ | $10010000_2$ | Barker Code |
| EB90 | $11101011_2$ | $10010000_2$ | Barker Code |
| EB90 | $11101011_2$ | $10010000_2$ | Barker Code |

To change trigger #3, or any "D" key value, all "D" key parameters must be entered, not just those to be changed. For example, if the "D" key parameters were set at 105.095.00.05.02 and you wanted to change the value of trigger #3 (high trigger) to 137 dB, press * then ENT and enter the new value 137.095.00.05.02 and press ENT. This procedure applies to "A" and "B" keys also. Keys C, E, and F are not for data entry. The "F" key allows storage of 1.5 seconds of data, or 12131 data points. To save data, press * and then F.

OPERATION FOR TYPICAL BOOM EVENT

The acquisition and evaluation of a typical boom event is shown in FIG. 2. Note that positive values of the data refer to compression portions of a sound wave, and negative values to rarefactions. In some of the analysis, absolute values of the sound pressure data are used. Thus the term "downward" may mean either going from one positive value to a less positive value, or from a one negative value to a less negative value (closer to zero). An "absolute peak" is the highest positive sound pressure level in an entire event. A "first local peak" is the first time in an event that the pressure goes from one positive value to a smaller positive value.

INITIALIZATION

Before start of data acquisition, a number of parameters need to be provided. During the initialization shown by block 712 of FIG. 7, and by the detailed flow charts of FIGS. 8, 9 and 10, default values of these parameters are provided. They may be modified by the user by keypad entries. These parameters include the following:
Trigger 2

A low trigger value for the absolute value of the sound pressure, shown in FIG. 2 by a positive value and an equal negative value. The value is set in terms of dB of sound pressure with respect to a reference level of 20 micropascals, the default value being 100 dB. This lower trigger level determines when data is to be collected. An event must exceed this trigger level to start data collection. (Note that a trigger 1 appears in the program listing, but is no longer used.)
Trigger 3

Levels are defined as above for trigger 2, the default value being 107 dB. An event must exceed this level to be considered a good event.
Timer 1

This is an event timer which is preset to determine a typical boom duration. The default is two seconds. This timer starts running when data exceeds trigger 2, and an event is evaluated if this time value is reached.
Timer 2

This is a cycle timer of shorter duration than timer 1. The default value is 0.2 seconds. Evaluation of an event starts if the absolute value of the data level remains below the trigger 2 value for this duration.
Positive pulse time This is a time during an event that the data values remain above the trigger 2 level. The time span for this determination is one of the starting parameters, with a default value of 10 milliseconds. The data is checked from the absolute peak, and must remain above the trigger 2 level for this duration.
Negative pulse time This value is determined from the negative absolute peak and looks backward. The time span is set at $\frac{1}{8}$ of the positive peak time span. The absolute value of the sound pressure data must remain greater than the negative value of trigger two for this amount of time.

Rise time

This is a change in value for the sound pressure over a period of time. The starting parameters include both a pressure rise and a time span that together determine the rise time standard. Actual rise times are compared to this standard for evaluation, and must be faster to be a good event.

The flags set during data collection and used during evaluation are as follows:

Flag 1

This flag is set to indicate the first data point that exceeds the trigger 2 level, to designate the start of an event.

Flag 2

This flag is set at all down crossings of trigger 2, e.g. the absolute value of the pressure data goes from greater than the trigger 2 value to less. If the absolute value returns above the trigger 2 level, and later crosses below that level, flag 2 is set to the later data point.

Flag 3

This flag indicates the current data point during acquisition.

Flag 4

This is the flag for the data point at the absolute positive peak.

Flag 5

This is the flag for the data point at the absolute negative peak.

DATA ACQUISITION

The data acquisition is shown by block 740 of FIG. 7, and by the detailed flow charts of FIGS. 11, 12 and 13. The routine starts every 125 microseconds on an interrupt, and gets a 16-bit value from an A/D converter which provides the value of sound pressure data detected by the microphone. As long as the data value is less than the absolute value of trigger 2, a running average table (RAT) is updated. The program then waits for the next interrupt.

At the start of a boom event, the data at point 202 in FIG. 2 is shown as a positive value greater than the positive value of trigger 2. Since event collection has not yet started, the program checks the data value and finds that it is greater than trigger 2. In response thereto, the memory storage is turned on and flag 1 is set, the event timer 1 is started, the cycle timer 2 is set up, the current data pointer (flag 3) is incremented and the data stored. Also the oldest and peak values are updated. The program returns to wait for the next interrupt.

At the next interrupt, event collection has started, and the program increments the current data pointer (flag 3) and stores the value in memory. The current data is compared to the peak and found to be greater, so the peak value is updated and also the pointer flag 3 for the current data. It is determined that the slope is rising. The program returns to wait for the next interrupt. The same operation occurs on subsequent data points through point 204 up to point 206.

At point 206 it is found that the current data is not greater than the previous peak value that has been flagged, so the peak value is not updated. It is found that the slope is now falling, the current data is greater than the positive value of trigger 2, and the operation returns (The data for point 206 is recorded as being the first local peak). As long as the slope is falling, the operation will be the same on subsequent interrupts. When the slope again rises, the operation will be like at point 204, with the peak value being updated at each data point, until point 208 is reached. Note that the peak value, updated whenever the current data is greater that the previous peak, is stored in a register for flag 4.

At point 208, the peak value stored for flag 4 is updated for the last time. At subsequent data points the current data will be less than the peak. The operation continues, sometimes with falling slope, and sometimes with rising slope, through points 210 and 212 until point 214 is reached.

At point 214 the slope is falling. It is now found that the current data is not greater than the positive value of trigger 2, and also not less than the negative value of trigger 2. Since the timer 2 is not on, the down crossing flag 2 is set equal to the current data pointer of flag 3. The timer 2 is loaded and started, and the operation returns.

For the next series of data points, timer 2 is now on so the program decrements its count. As long as timer 2 has not reached zero, operation proceeds. With timer 2 running, the program returns.

At point 216, it is found that the current data value is less than the negative value of trigger 2. Since the absolute value has increased, this is designated as an upcrossing. With timer 2 on, the operation proceeds to turn the timer off and return. Note that flag 2 remains set at the value for point 214 as being the last down crossing so far.

The operation proceeds with the data values becoming more negative through point 218 to point 220. At point 220, the negative peak is found and flag 5 is set. At point 230 the data value is still negative, but its absolute value is found to have become less than the absolute value of trigger 2, so flag 2 is set to designate a down crossing, and timer 2 is started. At subsequent data points the data absolute value remains less than the trigger 2 level, so the timer 2 continues to run. At the data point 240, timer 2 has counted down to zero, and in response thereto, event evaluation begins. Note that event evaluation could also be initiated by an interrupt from the event timer 1, if it reached its preset time before timer 2 timed out. Flag 2 indicates the last down crossing, which occurred at point 230, and this is used as the end of the event. Event data has been stored from flag 1 at point 202 to flag 2 at point 230.

EVENT EVALUATION

The data analysis for event evaluation is shown by block 732 of FIG. 7, and by the detailed flow charts of FIGS. 14-19. The evaluation phase comprises the steps of (1) determining if the peak value indicated by the fourth flag at point 208 is greater than the trigger 3 value, (2) determining if all of the data points from the peak indicated by the fourth flag at point 208 forward for said positive pulse time to point 210 are greater than the positive value of the low trigger, and determining if all of the data points from the negative peak indicated by the fifth flag at point 220 checked backward for said negative pulse time to point 218 have an absolute value greater than the absolute value of the low trigger, and (3) determining if the rise time to the peak indicated by the fourth flag at point 208 is steeper than said rise time standard, or if the rise time to the first local peak at point 206 is steeper than one third of the rise time standard.

A valid boom event is declared if all of the above tests of the evaluation phase are passed, a "Yes" counter is incremented by one and the date, time, and parameter sets are stored with the event. If the event fails any of the three tests, it is declared not a valid boom event, a "No" counter is incremented by one and the data is allowed to be overwritten by any new incoming data.

It is understood that certain modifications to the invention as described may be made, as might occur to one with skill in the field of the invention, within the scope of the appended claims. Therefore, all embodiments contemplated hereunder which achieve the objects of the present invention have not been shown in complete detail. Other embodiments may be developed without departing from the scope of the appended claims.

What is claimed is:

1. A method of analyzing and recording boom events, discerning the boom event from other noisy events with a boom screening methodology, in which sound levels are digitized with positive values for compression parts and negative values for rarefaction parts of sound waves, said method having an initialization phase, a data acquisition phase, and a evaluation phase;

wherein the initialization phase includes providing parameters which include a low trigger set to an absolute value of the sound pressure, so that there is a positive value and an equal negative value for the low trigger, a higher trigger having a value for a level which an event must exceed to be considered a good event, an event timer time duration which is preset to a predetermined value for a typical boom duration, a cycle timer time duration of shorter duration than that for the event timer, a positive pulse time, a negative pulse time, and a value for pressure rise and a value for a period of time which together define a rise time standard;

wherein flags are defined as a first flag for designating the start of an event, a second flag for down crossings which are defined as the absolute value of the pressure data going from greater than the absolute value of the low trigger value to less, an up crossing being defined as the absolute value of the pressure data going from less than the absolute value of the low trigger value to more, a third flag which indicates a current data point during the acquisition phase, a fourth flag for a data point which is an absolute positive peak, and a fifth flag for a data point which is an absolute negative peak;

wherein the data acquisition phase starts following completion of the initialization phase and comprises the steps of continuously monitoring a noise environment and digitizing a noise signature to provide digitized values for sound levels at fixed intervals, examining the sound levels with a data acquisition routine which starts at the beginning of each of said fixed intervals and ends by returning, and then waiting for the beginning of the next interval;

wherein the data acquisition routine comprises getting the digitized value for the sound level and using it as a current data value, determining if the absolute value of the current data value is greater that the absolute value of the low trigger, if "no" returning and if "yes" setting the first flag to indicate the start of an event, starting the event timer, incrementing the third flag as the current data pointer and storing the current data value in memory at the corresponding location as a data point, also storing the current data value as a peak value with the fourth flag, and returning; for intervals following the setting of the first flag, event collection being in progress, incrementing the third flag as a current data pointer and storing the current data value in memory as a data point, determining if the current data is greater than the value stored with the fourth flag and if so updating the peak value, a first local peak being stored as the first data point at which the data value changed from an increasing value to a decreasing value, determining if the current data value indicates a down crossing and if so setting the second flag and starting the cycle timer, determining if the current data indicates an up crossing and if so stopping the cycle timer, the second flag being reset on any subsequent down crossing so that it indicates the last down crossing up to that point, if the current data value is negative determining if it is a negative peak value and if so storing the value with the fifth flag;

determining if either the event timer or the cycle timer has timed out by reaching its preset value, and if so starting the evaluation phase;

wherein the evaluation phase comprises the steps of (1) determining if the peak value indicated by the fourth flag is greater than said higher trigger value, (2) determining if all of the data points from the peak indicated by the fourth flag forward for said positive pulse time are greater than the positive value of the low trigger, and determining if all of the data points checked backward from the negative peak indicated by the fifth flag for said negative pulse time have an absolute value greater than the absolute value of the low trigger, and (3) determining if the rise time to the peak indicated by the fourth flag is steeper than said rise time standard, or the if the rise time to the first local peak is steeper than one third of the rise time standard;

and declaring a valid boom event if all of the above tests of the evaluation phase are passed, and otherwise declaring it not a valid boom event.

2. A method of analyzing and recording boom events, discerning the boom event from other noisy events with a boom screening methodology, in which sound levels are digitized with positive values for compression parts and negative values for rarefaction parts of sound waves, said method having an initialization phase, a data acquisition phase, and a evaluation phase;

wherein the initialization phase includes providing parameters which include a low trigger set to an absolute value of the sound pressure, so that there is a positive value and an equal negative value for the low trigger, a higher trigger having a value for a level which an event must exceed to be considered a good event, an event timer time duration which is preset to a predetermined value for a typical boom duration, a cycle timer time duration of shorter duration than that for the event timer, a positive pulse time, a negative pulse time, and a value for pressure rise and a value for a period of time which together define a rise time standard;

down crossings being defined as the absolute value of the pressure data going from greater than the absolute value of the low trigger value to less, up crossings being defined as the absolute value of the pressure data going from less than the absolute value of the low trigger value to more;

wherein the data acquisition phase starts following completion of the initialization phase and comprises the steps of continuously monitoring a noise environment and digitizing a noise signature to provide digitized values for sound levels at fixed intervals, examining the sound levels with a data acquisition routine which starts at the beginning of each of said fixed intervals and ends by returning, and then waiting for the beginning of the next interval;

wherein the data acquisition routine comprises getting the digitized value for the sound level and using it as a current data value, determining if the absolute value of the current data value is greater than the absolute value of the low trigger, and if so, flagging the start of an event, starting the event timer, storing the current data value in memory as a data point, also storing the current data value as a peak value, and returning; for subsequent intervals, event collection being in progress, storing the current data value in memory as a data point, determining if the current data value is greater than the previous peak value and if so updating the peak value, determining if the current data indicates a down crossing and if so starting the cycle timer, determining if the current data indicates an up crossing and if so stopping the cycle timer, if the current data value is negative determining if it is a negative peak value and if so storing the value as a negative peak value;

determining if either the event timer or the cycle timer has timed out by reaching its preset value, and if so starting the evaluation phase;

wherein the evaluation phase comprises the steps of (1) determining if the peak value is greater than said higher trigger value, (2) determining if all of the data points from the peak forward for said positive pulse time are greater than the positive value of the low trigger, and determining if all of the data points checked backward from the negative peak indicated by the fifth flag for said negative pulse time have an absolute value greater than the absolute value of the low trigger, and (3) determining if any rise time before said peak meets a predetermined criteria using said rise time standard;

and declaring a valid boom event if all of the above tests of the evaluation phase are passed, and otherwise declaring it not a valid boom event.

3. A method of analyzing and recording given sound events, discerning the given sound event from other sound events with a screening methodology, in which sound levels are digitized with positive values for compression parts and negative values for rarefaction parts of sound waves, said method having an initialization phase, a data acquisition phase, and a evaluation phase;

wherein the initialization phase includes providing parameters which include a low trigger set to an absolute value of the sound pressure, so that there is a positive value and an equal negative value for the low trigger, a higher trigger having a value for a level which an event must exceed to be considered a good event, predetermined time duration values, a positive pulse time, a negative pulse time, and values which define a rise time standard as a change in value for data per unit time;

down crossings being defined as the absolute value of the pressure data going from greater than the absolute value of the low trigger value to less, up crossings being defined as the absolute value of the pressure data going from less than the absolute value of the low trigger value to more;

wherein the data acquisition phase starts following completion of the initialization phase and comprises the steps of continuously monitoring a noise environment and digitizing a noise signature to provide digitized values for sound levels at fixed intervals, examining the sound levels with a data acquisition routine which starts at the beginning of each of said fixed intervals and ends by returning, and then waiting for the beginning of the next interval;

wherein the data acquisition routine comprises getting the digitized value for the sound level and using it as a current data value, determining if the absolute value of the current data value is greater that the absolute value of the low trigger, and if so, flagging the start of an event, storing the current data value in memory as a data point, also storing the current data value as a peak value, and returning; for subsequent intervals, event collection being in progress, storing the current data value in memory as a data point, determining if the current data value is greater than the previous peak value and if so updating the peak value, determining if the current data indicates a down crossing and if so flagging that data point, determining if the current data indicates an up crossing and if so stopping flagging that data point, if the current data value is negative determining if it is a negative peak value and if so storing the value as a negative peak value;

determining if either the time that the absolute value of the data has been less than said low trigger value, or the time since the beginning of said the event, is greater than a predetermined criteria by comparison to said predetermined time duration values, and if so starting the evaluation phase;

wherein the evaluation phase comprises the steps of (1) determining if the peak value is greater than said higher trigger value, (2) determining if there are data points near the peak which are greater than the positive value of the low trigger for said positive pulse time, and determining if there are data points near negative peak which are greater than the negative value of the low trigger for said negative pulse time, and (3) determining if any rise time before said peak meets a predetermined criteria using said rise time standard;

and declaring a valid given sound event if all of the above tests of the evaluation phase are passed, and otherwise declaring it not a valid given sound event.

4. A method of analyzing and recording given sound events, discerning the given sound event from other sound events with a screening methodology, said method having an initialization phase, a data acquisition phase, and a evaluation phase;

wherein the initialization phase includes providing parameters which include a low trigger set to an absolute value of the sound pressure, a higher trigger having a value for a level which an event must exceed to be considered a good event, predetermined time duration value(s), and values which define a rise time standard as a change in value for data per unit time;

wherein the data acquisition phase starts following completion of the initialization phase and comprises the steps of continuously monitoring a sound environment and digitizing a sound signature to provide digitized values for sound levels at fixed intervals, examining the sound levels with a data acquisition routine which starts at the beginning of each of said fixed intervals and ends by returning, and then waiting for the beginning of the next interval;

wherein the data acquisition routine comprises getting the digitized value for the sound level and using it as a current data value, determining if the absolute value of the current data value is greater than the absolute value of the low trigger, and if so, flagging the start of an event, storing the current data value in memory as a data point, also storing the current data value as a peak value, and returning; for subsequent intervals, event collection being in progress, storing the current data value in memory as a data point, determining if the current data value is greater than the previous peak value and if so updating the peak value;

determining if there is a time duration during the event which is greater than a predetermined criteria by comparison to said predetermined time duration value(s), and if so starting the evaluation phase;

wherein the evaluation phase comprises the steps of (1) determining if the peak value is greater than said higher trigger value, (2) determining if there are a given number of data points near the peak which are greater than the absolute value of the low trigger and (3) determining if any rise time before said peak meets a predetermined criteria using said rise time standard;

and declaring a valid given sound event if all of the above tests of the evaluation phase are passed, and otherwise declaring it not a valid given sound event.

* * * * *